United States Patent
Singh et al.

(10) Patent No.: US 7,065,500 B2
(45) Date of Patent: Jun. 20, 2006

(54) AUTOMATIC ADVERTISER NOTIFICATION FOR A SYSTEM FOR PROVIDING PLACE AND PRICE PROTECTION IN A SEARCH RESULT LIST GENERATED BY A COMPUTER NETWORK SEARCH ENGINE

(75) Inventors: Narinder Pal Singh, Half Moon Bay, CA (US); Scott W. Snell, Hollywood, CA (US); Douglas T. Huffman, Altadena, CA (US); Darren J. Davis, Rowland Heights, CA (US); Thomas A. Soulanille, Pasadena, CA (US); Dominic Dough-Ming Cheung, South Pasadena, CA (US)

(73) Assignee: Overture Services, Inc., Pasadena, CA (US)

( * ) Notice: Subject to any disclaimer, the term of this patent is extended or adjusted under 35 U.S.C. 154(b) by 289 days.

(21) Appl. No.: 09/963,855

(22) Filed: Sep. 26, 2001

(65) Prior Publication Data

US 2002/0165849 A1 Nov. 7, 2002

Related U.S. Application Data

(63) Continuation-in-part of application No. 09/911,674, filed on Jul. 24, 2001, which is a continuation of application No. 09/322,677, filed on May 28, 1999, now Pat. No. 6,269,361.

(51) Int. Cl.
G06F 17/60 (2006.01)
G06F 17/30 (2006.01)

(52) U.S. Cl. ............... 705/26; 705/20; 705/22; 705/28; 705/29; 705/37; 707/2; 707/3; 707/4; 707/5

(58) Field of Classification Search .............. 707/2–5, 707/102, 100; 705/26, 20, 22, 28–29, 37; 715/501.1; 709/204–205, 213, 216; G06F 17/60, G06F 17/30
See application file for complete search history.

(56) References Cited

U.S. PATENT DOCUMENTS

| | | | | |
|---|---|---|---|---|
| 5,659,732 | A | 8/1997 | Kirsch | 395/605 |
| 5,717,923 | A | 2/1998 | Dedrick | 396/613 |
| 5,724,424 | A | 3/1998 | Gifford | 380/24 |
| 5,724,521 | A * | 3/1998 | Dedrick | 705/26 |
| 5,724,524 | A | 3/1998 | Hunt et al. | 395/237 |
| 5,748,954 | A | 5/1998 | Maudlin | 395/610 |
| 5,752,238 | A | 5/1998 | Dedrick | 705/14 |

(Continued)

FOREIGN PATENT DOCUMENTS

EP 1 067 731 A2 1/2001

(Continued)

OTHER PUBLICATIONS

SearchUP: URL Position Manager, obtained at the internet address https://www.securearea.net/searchup/login.cfm, Aug. 25, 1999.

(Continued)

*Primary Examiner*—Cuong Nguyen
(74) *Attorney, Agent, or Firm*—Brinks Hofer Gilson & Lione

(57) ABSTRACT

A notification method in a computer database system includes receiving a notification instruction from an owner associated with a search listing stored in the computer database system, monitoring conditions specified by the notification instruction for the search listing, and sending a notification to the owner upon detection of a changed condition of the search listing.

12 Claims, 24 Drawing Sheets

U.S. PATENT DOCUMENTS

| | | | |
|---|---|---|---|
| 5,754,939 A * | 5/1998 | Herz et al. | 455/3.04 |
| 5,768,521 A | 6/1998 | Dedrick | 395/226 |
| 5,778,367 A | 7/1998 | Wesinger, Jr. et al. | |
| 5,794,210 A | 8/1998 | Goldhaber et al. | 705/14 |
| 5,826,241 A * | 10/1998 | Stein et al. | 705/26 |
| 5,848,397 A | 12/1998 | Marsh et al. | 705/14 |
| 5,848,407 A * | 12/1998 | Ishikawa et al. | 707/2 |
| 5,852,820 A | 12/1998 | Burrows | 707/2 |
| 5,855,008 A | 12/1998 | Goldhaber et al. | 705/14 |
| 5,862,223 A | 1/1999 | Walker et al. | |
| 5,864,845 A | 1/1999 | Voorhees et al. | 707/5 |
| 5,864,846 A | 1/1999 | Voorhees et al. | 707/5 |
| 5,903,882 A | 5/1999 | Asay et al. | 705/44 |
| 5,918,014 A | 6/1999 | Robinson | 395/200.49 |
| 5,920,854 A | 7/1999 | Kirsch et al. | 707/3 |
| 5,920,859 A | 7/1999 | Li | 707/5 |
| 6,078,866 A | 6/2000 | Buck et al. | 702/2 |
| 6,108,639 A * | 8/2000 | Walker et al. | 705/26 |
| 6,125,361 A | 9/2000 | Chakrabarti et al. | 707/3 |
| 6,269,361 B1 * | 7/2001 | Davis et al. | 707/3 |
| 6,285,987 B1 | 9/2001 | Roth et al. | |
| 6,421,675 B1 * | 7/2002 | Ryan et al. | 707/100 |
| 6,584,493 B1 * | 6/2003 | Butler | 709/204 |
| 6,611,840 B1 * | 8/2003 | Baer et al. | 707/102 |
| 6,640,218 B1 * | 10/2003 | Golding et al. | 707/2 |
| 6,654,725 B1 * | 11/2003 | Langheinrich et al. | 705/14 |
| 6,763,334 B1 * | 7/2004 | Matsumoto et al. | 705/14 |
| 6,791,582 B1 * | 9/2004 | Linsey et al. | 345/751 |
| 2002/0004735 A1 | 1/2002 | Gross | |

FOREIGN PATENT DOCUMENTS

| | | |
|---|---|---|
| EP | 1070296 A1 * | 1/2001 |
| EP | 1 282 051 A1 | 8/2002 |
| EP | 1 282 059 A1 | 8/2002 |
| EP | 1 282 060 A2 | 8/2002 |
| EP | 1282051 A1 * | 2/2003 |
| EP | 1282060 A2 * | 2/2003 |
| GB | 2381345 A * | 4/2003 |
| WO | WO 99/20486 | 9/1999 |
| WO | WO 99/48028 | 9/1999 |
| WO | WO 2000/16218 | 3/2000 |
| WO | WO 00/73960 A1 | 5/2000 |
| WO | WO 01/01217 A2 | 6/2000 |
| WO | WO 2000/41090 | 7/2000 |
| WO | WO 2003014865 A2 * | 2/2003 |

OTHER PUBLICATIONS

SearchUP: URL Position Manager, obtained at the internet address https://www.securearea.net/searchup/newaccount.cfm, Aug. 25, 1999.

SearchUP: URL Position Manager, obtained at the internet address https://www.securearea.net/getaccount/login.cfm, Aug. 25, 1999.

Correspondence from Emilia F. Cannella to Mr. D. Reed, Reports Galore, regarding hitsgalore.com, Jun. 30, 1999.

Miller, Karen L., "Improve Your Ranking", Home Office Computer, vol. 16, No. 1, Jan. 1998, p. 51(2).

Jeff Fretzen, "Help For Getting The Word Out About Web Sites", PC Week, Vo. 14, No. 46, Nov. 3, 1997, p. 27(1).

Article from the Search Engine Report, "GoTo To Sell Positions", Mar. 3, 1998, http://www.searchenginewatch.com/sereport/9803-to-to-html.

Article from CNET News, "Engine Sells Results, Draws Fire", Jun. 21, 1996, http://www.nees.com/News?Item/0,4,1635,00.html.

Press release on Lightweight Directory Access protocol (LDAP), Netscape Comm. Corp. Mountain View, CA., Apr. 1996.

ClickMail Central directory, circa Apr. 1996.

GoTo.com, circa 1998, at www.goto.com.

Northern Light, circa 1997-98, at sirocco.northernlight.com.

Laura Rich, Adweek Online IQ News Online, Feb. 23, 1998, "New Search Engine Allows Sites to Pay Their Way to Top", from http://www.adweek.com/iq/_iqnews02.asp, Feb. 23, 1998.

Smith, Laura B., article "Going . . . Gone", PC Week, vol. 13, No. 34, Aug. 26, 1996, p. E1 (2), http://www.dialog-classic.com/DialogClassic/dialog.

Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.

Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.

Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.

Rose Aguilar, Staff Writer, CNET News.com, Apr. 29, 1996, "New Ad Model Charges By The Click", obtained at the internet address http://www.new.com/News/Item/0,4,1199,00.html, Jul. 29, 1999.

Alex Lash, Staff Writer, CNET News.com, Dec. 11, 1996, "Open Text Updates Tools", obtained at the internet address http://www.news.com/News/Item/0,4,6118,00.html, Jul. 29, 1999.

"About SearchUP, Inc.", Jul. 15, 1999, obtained at the internet address http://www.searchup.com/about.cfm.

"Testimonials"., Jul. 15, 1999, obtained at the internet address http://www.searchup.com/testimonials.cfm.

"Benefits", Jul. 15, 1999, obtained at the internet address http://www.searchup.com/benefits.cfm.

"Information", Jul. 15, 1999, obtained at the internet address http://www.searchup.com/information.cfm.

"Tips & Tricks", Jul. 15, 1999, obtained at the internet address http://wwww.searchup.com/tipsandtricks.cfm.

Correspondence from Bryan Buck, President of SearchUp.com, Jul. 7, 1999.

Saul Hansell "Alta Vista Invites Advertisers to Pay for Top Ranking", The New York Times, Apr. 15, 1999, p. C2.

Galore—Super Search Engine, May 21, 1999, obtained at the internet address http://www.galore.com/1/mainframe.shtml.

hitsgalore.com Search Engine, May 21, 1999, obtained at the internet address http://www.hitsgalore.com.

I Seek It "The Next Generation Search Engine", May 21, 1999, obtained at the internet address http://www.iseekit.com.

Correspondence from Emilia F. Cannella to Robert Brahms, CEO of BeFirst Internet Corporation regarding findwhat.com, Jul. 20, 1999.

Correspondence from Emilia F. Cannella to Michael Melcher, MC Services regarding SearchUp.com, Jul. 1, 1999.

Correspondence from Emilia F. Cannella to Robert G. Schuler, Esq., Kegler, Brown, Hill & Ritter regarding iseekit.com, Jul. 1, 1999.

Correspondence from Emilia F. Cannella to Andrew Conru, Vote Publishing regarding galore.com, Jun. 30, 1999.

SearchUp.com—Internet Directory, Automated Bid Placement System, obtained at the internet address http://www.

searchup.com/search.cfm, Aug. 25, 1999.

Advertising Age-Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti. . . le/archive/1998/02/21/BU102470.DTL.

Nelson Wang, "Engines Battle Irrelevance of Results", from http://www.internetworld.com/print/current/news/19980223-battle.html, Feb. 1998.

Search Engine Watch, Feb. 21, 1998, "GoTo Sells Positions", obtained at the internet address http://www.searchenginewatch.com/news.html, Feb. 23, 1998.

Jodi Mardesich, "Search Engine Charges Hit Sites", from http://wwww.sjmercury.com/businrss/center/goto022198.html, Feb. 1998.

Ken Glaser, Who Will GoTo.com?, OnlinePress.com, Feb. 1998.

Jeff Pelline, "New Search Engine Goes Commercial", from http://www.news.com/News/Item/0,4,19281,00.html, Feb. 20, 1998.

"Going, Going . . . ", The Wall Street Journal, Apr. 1998. p. B1.

David Coursey, "Coursey.com", Mar. 1998.

Don Clark, "Start-Up Plans Internet Search Service Typing Results To Advertising Spending", The Wall Street Journal, Feb. 20, 1998.

Laurie J. Flynn, "With GoTo.com's Search Engine, The Highest Bidder Shall Be Ranked First", The New York Times, Mar. 1998, p. C1.

Wyn Hilty, OCWeekly byte marks, "GoTo.Hell", from http://www.ocweekly.com/ink/archives/97/27byte-3.11.98-1.shtml, Mar. 13, 1998.

Jodi Mardesich, "Web Site Operators Pay For Top Billing", The News—Herald (Willoughby, OH), Mar. 2, 1998.

Laura Rich, Adweek Online IQ News Online, Feb. 23, 1998, "New Search Engine Allows Sites to Pay Their Way to Top", from http://www.adweek.com/iq/_iqnews02.asp, Feb. 1998.

Patricia Riedman, "Search Engine Startup To Auction Listings", Advertising Age Magazine, Feb. 23, 1998, p. 34.

Steven Vonder Haar, ZDNet,com, Feb. 19, 1998, "Searching For The Highest Bidder", obtained at the internet address http://www.zdnet.com/intweek/daily/980219i.html, Feb. 23, 1998.

Nelson Wang, "Engines Battle Irrelevance of Results", Internet World, Feb. 10, 1998, p. 1.

Interactive Week Magazine, Garden City, N.Y. May 25, 1998.

Jeff Pelline, "New Search Engine Goes Commercial", CNET News.com, from http://www.news.com/News/Item/0,4,19281,00.html, Feb. 20, 1998.

Hilty, "GoTo.Hell-What Happens When On Line Search Engine Accepts Cash From Web Sites?" from http://www.ocweekly.com/link/archives/97/27/byte-3.11.98-1.html, Mar. 1998.

Flynn, "With GoTo.com's Search Engine, the Highest Bidder Shall Be Ranked First", by the New York Times, Mar. 1998.

Clark, "Start-Up Plans Internet Search Service Tying Results To Advertising Spending", from the Wall Street Journal, Feb. 1998.

"Going, Going . . . ", from A Closer Look of the Wall Street Journal-Marketplace, Apr. 1998.

"Coursey.com", David Coursey's Insider report on Personal Computing, the Internet and Communications, Mar. 1998.

Glaser, "Who Will GoTo.com", from OnlinePress.com, Feb. 1998.

Mardesic, "Search Engine Charges Hit Sites", from http://www.sjmercury.com/business/center/goti022198.html., Feb. 1998.

"News Watch About Search Engines", from http://searchenginewatch.com/ness.html, Feb. 1998.

Wang, "Engines Battle Irrelevence of Results", from Internet World.

Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.

McWilliams, PC World Online, Feb. 23, 1998, "Search Engine To Sell Top Positions On Results Lists", from http://www.pcworld.com/news/daily/data/_0298/....html.

"Search Engine Start Up To Auction Listings", from http://www.adage.com/interactive/daily/index/html, Feb. 1998.

Alyson, "Searching The Search Engines", from Bacon's, May 1998.

Pelline, "Pay-for-placement gets another shot", from http://www.newscom.?news/item/0,4,19307,00.html, Sep. 1997.

IBM Technical Disclosure Bulletin, "Organizing A Ranked List of Search Matches", Nov. 1994.

Jeffrey Brewer, ClickZ Today, Aug. 18, 1998, "Pay-For-Performance: Creating More And Better Value", obtained at the internet address http://www.clickz.com, Aug. 18, 1998.

Jesse Berst, ZDNet, Aug. 17, 1998, "Search Sites' Shocking Secret", obtained at the internet address http://www.zdnet.com/anchordesk/story/story$_{13}$ 2432.html, Aug. 17, 1998.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

G. David Doran, "Pay to Play", Entrepreneur, Jul. 1998, p. 18.

Advertising Age-Interactive Daily Homepage; obtained at the internet address http://www.adage.com/interactive/daily/index.html, Jun. 8, 1998.

Kim Komando, "With About 320 Million Sites, Search Engines Offer Some Help", copyright 1998, Los Angeles Times Syndication.

Margot Williams, "How To Ease Your Online Searches", Lansing State Journal, Jun. 1, 1998.

"GoTo.com Gets Venture Funding", Internet World Magazine, Jun. 1, 1998.

Database of Corporate ResourceNet, "New Service Puts An Auction Search Engine Under One Roof", Electronic Advertising & Marketplace Report, vol. 12, Issue 8, Apr. 1998, p. 6.

Espe, "Online Search Engines Start To Charge For Listings", Washington Business Journal, vol. 18, Issue 1, May 1999, p. 31.

Dawson et al., "2 Search Sites Narrow Their Parameters", Adweek-Western Edition, vol. 48, Issue 42, Oct. 1998, p. 1.

Database of Corporate ResourceNet, "Bits", from Adweek-

Eastern Edition, vol. 40, Issue 14, Apr. 1999, p. 46.
Komando, "Searching For Search Engines—from Dogpile to Deja News", Business First-Colombus, vol. 14, Issue 43, Jun. 1998, p. 46.
Database of Corporate ResourceNet, New services Aim to Boost Efficiency of Search Engines, Electronic Advertising & Marketplace Report, vol. 12, Issue 13, Jun. 1998, p. 6.
Database of Corporate ResourceNet, "Goto.com Chooses Quest's SharePlex(R) for Oracle Software to Ensure Uptime for Business-Critical Web Site", PR Newswire, Jun. 2000.
Database of Corporate ResourceNet, "Capitalist Tool", Time Canada, vol. 151, Issue 8. Mar. 1998, p. 41.
Database of DialogClassic(m), :Homestead Technologies' Continued Success Draws $17.50 Million In second Round of Venture Funding, PR Newswire, Apr. 1999.
"APS Search Tools—Patent Search Client Strategy", by Sep. 1997.
"Frequently Asked Questions NT Image Search & Retrieval (IS&R)", by Dec. 1997.
"Chapter 1-Introduction to Dialog", by Dialog Information Service, Inc. pp. 1-1 to 1-14.
"Automated Patent System (APS) Workstation Reference Manual", by Jul. 1996.
Frentzen, Jeff, "Help for Getting the Word Out About Web Sites", PC Week, v14, n46, p. 27(1), Nov. 3, 1997.
Miller, Karen L., "Improve Your Ranking (Building Web Sites to Attract Web Searches)", Home Office Computer, v16, n1, p. 51(2) Jan. 1998.
Wingfiled, "Another Engine Takes Ads By The Click", from http://www.news.com?news/Item/0.4.1387,00/html, May 1996.
Pelline, "New Search Engine Goes Commercial", by CNET News.com, Feb. 1998.
Wang, "Engines Battle Irrelevance of Results-New Search Service Hope To Fill The Void", by Internet World, Feb. 1998.
Vondr Haar, "Searching For The Highest Bidder", from *Inter@active* week.
Riedman, "Search Engine Startup To Auction Listings", from Interactive-Advertising, Feb. 1998.
Rich, "New Search Engine Allows Sites To Pay Their Way to Top", from http://www.adweek.com/iq/iqnews02.asp.
Mardesich, "Web Site Operators Pay for Top Billing-Search Engine Allows Site Sponsors to Buy Place On Special List", from Knight Ridder Newspapers, Mar. 1998.
Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.
News of The Week articles, *Telephony*, May 1, 1995, pp. 8 and 10.

Nuts 'N Bolts articles, *Target Marketing*, Oct. 1997, 1 page.
DoubleClick TestIt!, obtained at the internet address: http://web.archive.org/web/19980205034316/www.doubleclick.com/nf/adinfo/testiset.htm, dated Oct. 16, 2002, 4 pages.
DoubleClick Frequently Asked Questions, obtained at the internet address: http://web.archive.org/web/19980205033925/www.doubleclick.com/nf/adinfo/facts.htm, dated Oct. 16, 2002, 5 pages.
"New Service Puts Ad Auction, Search Engine Under One Roof", article from Electronic Advertising & Marketplace Report, *Simba Information, Inc.* Apr. 28, 1998, 2 pages.
Google Search, communication from Jeffrey Brewer at Jeffrey@goto.com, titled "Need reverse stemming software", dated May 27, 1998, obtained at the internet address: http://groups.google.com/groups?selm=356CEE4A8DE882A%40goto.com, on Dec. 19, 2002, 1 page.
Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.
Schwartz, Randal L., "Click-Through Tracking in Perl", *Web Techniques*, dated May 1998, located at the internet address: www.webtechniques.com, 3 pages.
Van Roeden, Adriaan, "Your Own Search Engine With SWISH, A Custom Search Facility For Your Web Site", *Web Techniques*, dated Nov. 1996, located at the internet address: www.webtechniqes.com, pp. 63-66 pages.
Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.
Help on Making Queries—Search by Company or Product, obtained at the internet address: http://web.archive.org/web/1998120350002/solutions.sun.com/search-help.htm, printed on Dec. 19, 2002, 4 pages.
Online Updating, Sun Microsystems Sun Solutions Catalog obtained at the internet address: http://web.archive.org/web/19990220190636/solutions.sun.com/editmodule/help.html, printed on Dec. 19, 2002, 2 pages.
European Patent Office Search Report for corresponding Patent Application No. EP 02 25 6630 dated May 17, 2004, 4 pages.
Canadian Search Report for corresponding Canadian Patent Application No. 2,404,276 dated Dec. 13, 2004, 3 pages.
Korean Search Report for corresponding Korean patent application No. 10-2002-58312, dated Dec. 2, 2004 (2 pages) and English translation thereof (1 page).
Chinese Office Action for corresponding Chinese Patent Application No. 02156330.6 dated Jan. 21, 2005, 3 pages.

* cited by examiner

AUTOMATIC ADVERTISER NOTIFICATION FOR A SYSTEM FOR PROVIDING PLACE AND PRICE PROTECTION IN A SEARCH RESULT LIST GENERATED BY A COMPUTER NETWORK SEARCH ENGINE

CROSS REFERENCE TO RELATED APPLICATIONS

This application is a continuation in part of application Ser. No. 09/911,674, filed Jul. 24, 2001 in the names of Darren J. Davis, et al., which application is incorporated herein in its entirety and which is a continuation of application Ser. No. 09/322,677, filed May 28, 1999, in the names of Darren J. Davis, et al., now U.S. Pat. No. 6,269,361, which application is also incorporated herein in its entirety.

REFERENCE TO COMPUTER PROGRAM LISTINGS SUBMITTED ON COMPACT DISK

A compact disc appendix is included containing computer program code listings pursuant to 37 C.F.R. 1.52(e) and is hereby incorporated by reference in its entirety. The total number of compact discs is 1 including 24,443 files and 105,738,488 bytes. The files included on the compact disc are listed in a file entitled "dir_s" on the compact disc. Because of the large number of files contained on the compact disc, the required listing of file names, dates of creation and sizes in bytes is included in the file dir_s on the compact disk and incorporated by reference herein.

BACKGROUND OF THE INVENTION

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages". These pages reside on web servers and are accessible via the Internet. The web is therefore a vast database of information dispersed across countless individual computer systems that is constantly changing and has no recognizable organization or morphology. Computers connected to the Internet may access the web pages via a program known as a browser, which has a powerful, simple-to-learn graphical user interface. One powerful technique supported by the web browser is known as hyperlinking, which permits web page authors to create links to other web pages which users can then retrieve by using simple point-and-click commands on the web browser.

The pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information.

The availability of powerful new tools that facilitate the development and distribution of Internet content has led to a proliferation of information, products, and services offered on the Internet and dramatic growth in the number of consumers using the Internet. International Data Corporation, commonly referred to as IDC, estimates that the number of Internet users will grow from approximately 97 million worldwide in 1998 to approximately 320 million worldwide by the end of 2002. In addition, commerce conducted over the Internet has grown and is expected to grow dramatically. IDC estimates that the percentage of Internet users buying goods and services on the Internet will increase from approximately 28% at the end of 1998 to approximately 40% in 2002, and that over the same period of time, the total value of goods and services purchased over the Internet will increase from approximately $32.4 billion to approximately $425.7 billion.

The Internet has emerged as an attractive new medium for advertisers of information, products and services to reach consumers. However, the World Wide Web is composed of a seemingly limitless number of web pages dispersed across millions of different computer systems all over the world in no discernible organization. Mechanisms, such as directories and search engines, have been developed to index and search the information available on the web and thereby help Internet users locate information of interest. These search services enable consumers to search the Internet for a listing of web sites based on a specific topic, product, or service of interest.

Search services are, after e-mail, the most frequently used tool on the Internet. As a result, web sites providing search services have offered advertisers significant reach into the Internet audience and have given advertisers the opportunity to target consumer interests based on keyword or topical search requests.

In a web-based search on an Internet search engine, a user enters a search term comprising one or more keywords, which the search engine then uses to generate, in real time, a listing of web pages that the user may access via a hyperlink. The search engines and web site directories of the prior art, however, rely upon processes for assigning results to keywords that often generate irrelevant search results. The automated search technology that drives many search engines in the prior art rely in large part on complex, mathematics-based database search algorithms that select and rank web pages based on multiple criteria such as keyword density and keyword location. The search results generated by such mechanisms often rely on blind mathematical formulas and may be random and even irrelevant. In addition, search engines that use automated search technology to catalog search results generally rely on invisible web site descriptions, or "meta tags", that are authored by web site promoters. Web site owners may freely tag their sites as they choose. Consequently, some web site promoters or promoters insert popular search terms into their web site meta tags which are not relevant because by doing so they may attract additional consumer attention at little to no marginal cost. Finally, many web sites have similar meta tags, and the search engines of the prior art are simply not equipped to prioritize results in accordance with consumers' preferences.

Search engines and web site directories may also rely on the manual efforts of limited editorial staffs to review web page information. Since comprehensive manual review and indexing of an unpredictable, randomly updated database such as the web is an impossible task, search engine results are often incomplete or out-of-date. Moreover, as the volume and diversity of Internet content has grown, on many popular web search sites, consumers must frequently click-through multiple branches of a hierarchical directory to locate web sites responsive to their search request, a process that is slow and unwieldy from the consumer's standpoint. Thus, the prior art search engines are ineffective for web page owners seeking to target their web exposure and distribute information to the attention of interested users on a current and comprehensive basis.

Furthermore, current paradigms for generating web site traffic, such as banner advertising, follow traditional advertising paradigms and fail to utilize the unique attributes of the Internet. In the banner advertising model, web site promoters seeking to promote and increase their web exposure often purchase space on the pages of popular commercial web sites. The web site promoters usually fill this space with a colorful graphic, known as a banner, advertising their own web site. The banner may act a hyperlink a visitor may click on to access the site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the destination site, may be quite low. Web site promoters are therefore paying for exposure to many consumers who are not interested in the product or service being promoted, as most visitors to a web site seek specific information and may not be interested in the information announced in the banner. Likewise, the banner often fails to reach interested individuals, since the banner is not generally searchable by search engines and the interested persons may not know where on the web to view the banner.

Thus, the traditional paradigms of advertising and search engine algorithms fail to effectively deliver relevant information via the World Wide Web to interested parties in a cost-effective manner. Internet advertising can offer a level of targetability, interactivity, and measurability not generally available in other media. With the proper tools, Internet advertisers have the ability to target their messages to specific groups of consumers and receive prompt feedback as to the effectiveness of their advertising campaigns.

Ideally, web site promoters should be able to control their placement in search result listings so that their listings are prominent in searches that are relevant to the content of their web site. The search engine functionality of the Internet needs to be focused in a new direction to facilitate an on-line marketplace which offers consumers quick, easy and relevant search results while providing Internet advertisers and promoters with a cost-effective way to target consumers. A consumer utilizing a search engine that facilitates this on-line marketplace will find companies or businesses that offer the products, services, or information that the consumer is seeking. In this on-line marketplace, companies selling products, services, or information bid in an open auction environment for positions on a search result list generated by an Internet search engine. Since advertisers must pay for each click-through referral generated through the search result lists generated by the search engine, advertisers have an incentive to select and bid on those search keywords that are most relevant to their web site offerings. The higher an advertiser's position on a search result list, the higher likelihood of a "referral"; that is, the higher the likelihood that a consumer will be referred to the advertiser's web site through the search result list. The openness of this advertising marketplace is further facilitated by publicly displaying, to consumers and other advertisers, the price bid by an advertiser on a particular search result listing.

U.S. Pat. No. 6,269,361 describes a system and method for enabling promoters to influence a position on a search result listing generated by an Internet search engine for a specified set of search terms. The system and method enable advertisers to specify key search terms to the search engine so as to target their search result list placement to the search queries most relevant to their business. Further, the system and method enable promoters to examine their current search term and placement couplings online and to make substantially instantaneous changes to their selected search terms, placements, and web site titles and descriptions.

In this system, advertisers, or web site promoters, establish bid amounts for search listings with a pay for performance web site or marketplace operator which are chargeable to the advertiser by the marketplace web site operator. In response to a received query from a searcher, search listings are located, arranged according to bid and displayed to the searcher. If a searcher selects or clicks through an advertiser's search listing, the bid amount is charged to the advertiser by the pay for performance web site operator. Advertisers can control the position of their search listing in the search result list by adjusting the bid amount associated with the search listing.

The method described in the U.S. Pat. No. 6,269,361 can be burdensome to manage for an advertiser. In particular, advertisers want to maintain favorable positions in the search results (so as to obtain a high volume of qualified traffic) at a favorable price. The system described in U.S. Pat. No. 6,269,361 provides no ready means to do that. Advertisers can resort to frequent inspection of their ranking on search terms that are important to them, for example by performing a search on www.goto.com. When they observe a change as a consequence of competing advertisers' bidding activities, they can log in to the pay for performance website and change their bids manually in response. In the case where they have been outbid for a position they want to retain, they can increase their bid to retake the position, if the required cost per click ("CPC"), which is equal to the amount of their bid, is one they are willing to pay. In the case where the bid of the listing ranked below theirs has decreased, some advertisers may wish to lower their bid to reduce the amount they pay while still maintaining their position in the results set.

There are many other tasks that advertisers typically perform in addition to managing the position of their listings, including keeping track of the accumulated costs of listings, the number of clicks of listings, the click through rate (CTR) of listings, and checking their account balance. In addition, advertisers have to constantly keep track of the changing marketplace, e.g., to check if the bid of a listing is too high, or if a more desirable rank is now affordable.

Managing the budget is a vital business concern for advertisers, and there is a need to keep track of the breakdown of expenses for different terms. For example, around Father's Day, the number of searches for the term "tie" may increase, resulting in going over budget. Alternatively, the costs may decrease following Father's Day, and the additional funds could be allocated to other terms.

Advertisers must also keep track of the number of clicks that a listing is getting, e.g., to calculate the conversion rate. If a listing is getting many clicks but few sales, then it could be the case that the listing's description is not sufficiently specific. Alternatively, if a listing is getting too few clicks, it could be the case that other advertisers have entered the marketplace, which has resulted in the listing being at a worse rank than before.

It is also important for advertisers to keep track of the click through rate (CTR) of listings. For example, a new title or description for a listing may result in a lower CTR if it is less clear than what was there before. Keeping track of the CTR ensures that corrective action can be taken promptly.

Advertisers must also keep track of their account balance at the pay for performance marketplace. The balance should never reach zero, in order to ensure continued service without interruption. In addition, it is important to keep track of the account balance to ensure that the budget is spent according to plan. For example, if the balance is going down too slowly in the first week, the advertiser can take corrective action to increase the CPC of listings to get back on track.

There are other marketplace conditions that advertisers must keep track of. These include checking if the bid of a listing is too high for its current rank. For example, an advertiser $A_1$ may set the CPC of a listing to $0.50 for the listing to be at rank 2—advertiser $A_2$ is at rank 3 with a CPC of $0.49. A few hours later, $A_2$ changes the CPC of his listing to $0.45, while still remaining at rank 3. Advertiser $A_1$ can now reduce the CPC of his listing from $0.50 to $0.46, while still maintaining the listing at rank 2.

Advertisers must also keep track of the changing costs in the marketplace for different ranks. A rank that was unaffordable earlier may now become affordable, or vice-versa. For example, advertiser $A_1$ is at rank 5 and wishes to be at rank 3 in order to get higher traffic. The current CPC for rank 3 is $1.00, and the CPC for rank 4 is $0.75. $A_1$ can afford at most $0.80 for this listing. That is, the advertiser's return on investment (ROI) analysis indicates that anything higher will result in a loss. If the advertiser at rank 3 drops out, $A_1$ can jump to rank 3 with a CPC of $0.76, which is within his budget of $0.80.

The previous examples illustrate the various actions that advertisers must perform manually to manage their listings. Some advertisers do these tasks several times a day. Some advertisers have a plurality of employees dedicated to the management of their participation in a pay for placement marketplace, monitoring the positions of their listings and adjusting their bids, managing their budget, etc. The manual process of polling of the status of listings, checking the competitors in the marketplace, and checking the account status is time consuming and wasteful. Only some of these concerns need addressing at a given time. Therefore, a need exists for a method and apparatus for advertisers to manage their listings more effectively.

U.S. application Ser. No. 09/922,028, entitled "System And Method For Providing Place And Price Protection In A Search Result List Generated By A Computer Network Search Engine," filed Aug. 3, 2001, discloses a system which may be referred to as Price and Place Protection. This application is commonly assigned with the present application and is incorporated herein by reference. In the disclosed system, an advertiser's bid does not establish a fixed CPC. Instead, his bid sets the maximum CPC the advertiser will incur. Further, the disclosed embodiments allow the advertiser to specify a desired rank in the search results displayed to the searcher. The rank of a search listing is the ordinal positioning of the search listing among a group of search listings matching the searcher's search term. Higher or better listed search listings are displayed higher on a page and earlier on a number of pages of search listings. The system of the present embodiments determines the actual rankings and actual CPC's. The listings matching a search may then be ranked in descending order of CPC, with priority among listings of equal CPC by chronological seniority.

If these inefficiencies are not addressed by a marketplace promoter, then an economic incentive remains for advertisers to produce automated services of their own to interact with the account management systems of the marketplace operator to obtain the economic advantage available relative to the limited automated services provided by the marketplace operator. As a further consequence, such a situation provides economic incentive for third parties to produce automated services for advertisers, for a fee, or a cut of the alleged savings produced. This is already happening.

BRIEF SUMMARY

By way of introduction only, the present embodiments may be referred to collectively as Auto Notification. Auto Notification is an improvement on existing pay for performance marketplace systems. In the basic marketplace system, an advertiser logs on to the advertiser interface and manages his advertising campaign by examining the marketplace information and the information related to his listings. For example, an advertiser can identify a set of terms, their description, and other information, which includes the CPC for each term, which is the amount that the advertiser will pay if a user clicks on the listing. An advertiser can also check the number of clicks at different ranks for a search term, examine the other competitive listings for a term, check his account balance, add funds to his account, etc. Subsequently, when a search term matches a search query received from a searcher, economic value may be given by the advertiser to the marketplace operator.

The embodiments described herein use the concept of a bid which corresponds to economic value which the advertiser will give when network locations associated with the advertiser is referred to a searcher in response to a query from the searcher. The economic value may be a money amount charged or chargeable to the advertiser, either directly or indirectly. The economic value may be an amount debited from an account of the advertiser. The amount may be a money amount or another value, such as credit points.

The economic value may be given by the advertiser to the operator of a database search system or to a third party.

The economic value is given when one or more network locations, such as advertiser web sites, are referred to a searcher. The referral may be by presenting the network locations on a screen used for data entry and receipt by the searcher, alone or with other search results. This is referred to as an impression. Alternatively, and in an embodiment generally described herein, the referral may occur when the searcher clicks on or clicks through to access the network locations of the advertiser, as will be described in greater detail below. Or the referral may be by some other action taken by the searcher after accessing the network locations of the advertiser.

The embodiments herein automate many of the steps performed by an advertiser. Currently an advertiser must periodically examine the state of his listings, the state of the marketplace, and his account information, in order to see if any of the conditions that he cares about are true. This manual examination of the marketplace, listings, and his account is time consuming and wasteful, as most of the time no special action is required.

The disclosed embodiments of Auto Notification enable an advertiser to specify the conditions the advertiser cares about. The system provides an automated agent that acts on behalf of the advertiser, constantly checking if any of the conditions are true. The agent is a software process or application operating in conjunction with data maintained by the marketplace system. If all is well and no conditions are true, then the agent takes no action. Otherwise, the agent makes a note of the condition that is true, and can send a message to alert the advertiser. The message can include means for the advertiser to correct the undesirable conditions, as will be described below. Messages can be sent whenever a condition is true, or they can be aggregated and sent periodically, at the control of the advertiser.

With Auto Notification, an advertiser need no longer manually search for conditions that are true. Instead, the system automatically notifies the advertiser of the true conditions and possible corrective actions, at the times specified by the advertiser.

An advertiser can request auto notification for zero or more conditions. Some conditions are related to the listings of the advertiser, and each listing can have zero or more conditions associated with it. In accordance with the present embodiments, each auto notification function has four components:
 1. notification condition: information about the state requiring attention
 2. notification time(s): when the notifications should be sent
 3. notification mode(s): how the advertiser should be notified, and
 4. notification action type(s): the types of corrective actions to include in any notification.

Notification Condition

In accordance with the present embodiments, there are nine types of conditions that an advertiser can select from:
 1. position: related to the position of a listing
 2. cost: related to the accumulated costs for some listings
 3. account-balance: related to the funds remaining in advertiser's account (e.g., to pay for listings that are clicked on)
 4. impressions: the number of impressions received by some listings
 5. clicks: the number of clicks received by some listings
 6. CTR: the click through rate of some listings
 7. CPC-too-high: if the cost per click (CPC) of a listing can be reduced without impacting its rank
 8. Average CPC too high: the average CPC, the total cost divided by the total clicks, is higher than some threshold.
 9. rank-CPC: related to the CPC for a given rank and term Each condition has its own set of parameters, which are specified by an advertiser. Some of the parameters may have default values, which are at the discretion of the marketplace operator. The parameters for the different conditions are described below.

A position condition monitors the position of a listing. Each position condition has the following parameters:
 1. listing: the listing whose position is being monitored. This could be a listing of the advertiser, or the listing of some other advertiser.
 2. absolute/relative: an indication of whether the absolute position of the listing is being monitored, or if the position relative to some other listing is being monitored. If the position is relative to another listing, then the other listing is also specified.
 3. within/without: the condition is true if the listing is within or outside the specified range.
 4. specific/range: a specific rank or range of ranks. For example, "rank 3" is a specific rank, and "ranks 3 to 5" (inclusive) is a range of ranks, as are "ranks greater than or equal to 4" and "ranks less than 3".

The following are all examples of position conditions:
 1. "My listing $L_1$ is not at rank 3" listing: $L_1$, absolute/relative: absolute, within/without: without, specific/range: rank 3.
 2. "Another listing $L_2$ is at rank 1" listing: $L_2$, absolute/relative: absolute, within/without: within, specific/range: rank 1.
 3. "My listing $L_3$ is at ranks 4 through 8 inclusive" listing: $L_3$, absolute/relative: absolute, within/without: within, specific/range: ranks 4 through 8.
 4. "My listing $L_4$ is more than 2 ranks lower than another listing $L_5$" listing: $L_4$, absolute/relative: relative to $L_5$, within/without: without, specific/range: ranks 1 through 2.
 5. "My listing $L_6$ is 3 ranks higher than another listing $L_7$" listing: $L_6$, absolute/relative: relative to $L_7$, within/without: within, specific/range: rank −3 (negative ranks are above the reference rank and positive ranks are below).

A marketplace operator may provide a variety of user interfaces for entering parameters. For position constraints, a marketplace may provide a simple interface for tracking multiple listings, e.g., to track the change in position of all listings.

A cost condition monitors the total CPC expenditures for one or more listings of the advertiser in a given time interval. At the start of every time interval the accumulated costs are zero. The starting point of each time interval is at the discretion of the marketplace operator. For example, all hourly intervals could start at the start of every half hour. Each cost condition has the following parameters:
 1. listings: one or more listings whose CPC expenditure is being monitored.
 2. limit: the expenditure limit for the accumulated CPCs for all the listings, e.g., $300.00.
 3. interval: the time period for the limit, e.g., one week.

The following are all examples of cost conditions:
 1. "The CPC charges for listing $L_1$ exceed $300.00 in any hour" listings: $L_1$, limit: $300.00, interval: 1 hour 2. "The CPC charges for $L_2$ and $L_3$ exceed $195.00 in any month" listings: $L_2$ and $L_3$, limit: $195.00, interval: 1 month The account-balance condition monitors the amount of funds remaining in the account of an advertiser. Some advertisers may be required to pre-pay a deposit, which is used to draw down the CPC charges incurred by the advertiser. An advertiser may periodically replenish his account balance to ensure continual service. Each account-balance condition has the following parameters:

1. threshold: the condition is true when the account balance falls below the threshold amount.

The following are all examples of account-balance conditions:

1. "My account balance is less than $100.00" threshold: $100.00
2. "My account balance is less than $350.00" threshold: $350.00

The impressions condition monitors the aggregate number of impressions for a set of listings of an advertiser in a given interval. At the start of every time interval the accumulated impressions are zero. The starting point of each time interval is at the discretion of the marketplace operator. In one embodiment, an impression is defined as follows. Whenever a user types in a search term, a set of matching search results are presented. The presentation of a listing to a user is counted as an impression. If a listing is on a following page, and the user does not search beyond the current page, then this does not count as an impression. Other definitions may be used as well. If the rank of a listing changes, then the number of impressions for the listing can be reset to zero. This is at the discretion of the advertiser.

Each impressions condition has the following parameters:

1. listings: one or more listings whose aggregate number of impressions is being monitored.
2. within/without: whether the condition is true if the number of impressions is within or outside the range.
3. range: the range of the impressions being monitored, e.g., 100 to 200.
4. interval: the time period for the limit, e.g., 1 day.

The following are all examples of impressions conditions:

1. "Listings $L_1$ has more than 1000 impressions in one hour"
    listings: $L_1$, within/without: without, range: 0 to 1000, interval: 1 hour
2. "Listings $L_2$, $L_3$, and $L_4$ together have less than 100 impressions in a day"
    listings: $L_2$, $L_3$, and $L_4$, within/without: within, range: 0 to 99, interval: 1 day The clicks condition monitors the aggregate number of user clicks for a set of listings of an advertiser in a given interval. At the start of every time interval the accumulated clicks are zero. The starting point of each time interval is at the discretion of the marketplace operator. Whenever a user types in a search term, a set of matching search results are presented. If a user selects a matching listing by pointing to a hyperlink or typing in a uniform resource locator, this is referred to as clicking on the listing. Other definitions of clicking may be used as well. If a searcher clicks on a matching listing, then this is counted as a click for the listing. If the rank of a listing changes, then the number of clicks for the listing can be reset to zero. This is at the discretion of the advertiser.

Each clicks condition has the following parameters:

1. listings: one or more listings whose number of clicks is being monitored.
2. within/without: whether the condition is true if the number of clicks is within or outside the range.
3. range: the range of the clicks being monitored, e.g., 1,000 to 4,000.
4. interval: the time period for the limit, e.g., 1 quarter.

The following are all examples of clicks conditions:

1. "Listings $L_1$ has fewer than 100 clicks in one day"
    listings: $L_1$, within/without: within, range: 0 to 99, interval: 1 day
2. "Listings $L_2$ and $L_3$ together have more than 1,500 clicks in a week"
    listings: $L_2$, and $L_3$, within/without: without, range: 0 to 1,500, interval: 1 week The CTR condition monitors the aggregate click through rate for a set of listings of an advertiser over an interval. The aggregate CTR over an interval is the aggregate number of clicks for the interval divided by the aggregate number of impressions for the same interval. When starting to monitor the aggregate CTR, there may be insufficient impressions for valid data. The marketplace operator may select a minimum number of impressions that are required before considering the CTR conditions to be valid.

Alternatively, an advertiser may specify probability and a margin of error, and from the marketplace operator can calculate the minimum number of clicks required before considering the CTR condition to be valid. For example, the advertiser may specify a 95% probability and a margin of error of 3%. From Statistics we know that if the CTR is a Standard Normal Distribution, there is a 95% probability that a value is between +/−1.96 standard deviations of its mean. So if we take n measurements and get an observed CTR of p', then $$1.96 \times \sqrt{\frac{p' \times (1 - p')}{n}} \leq 3\%.$$

This depends on the observed CTR of p' and can always be achieved by the marketplace operator by waiting for a sufficiently large "n." Any introductory Statistics text can describe this in detail, for example, "Larsen, Richard J. and Marx, Morris L. *An Introduction to Mathematical Statistics and Its Applications,*" 3rd edition (Jan. 15, 2000) Prentice Hall College Div; ISBN: 0139223037.

If the rank of a listing changes, then the number of impressions and clicks for the listing can be reset to zero. This is at the discretion of the advertiser.

Each CTR condition has the following parameters:

2. listings: one or more listings whose aggregate CTR is being monitored.
3. within/without: whether the condition is true if the aggregate CTR is within or outside the range.
4. range: the range of aggregate CTR being monitored, e.g., 1/100 to 1/200.
5. interval: The time period for the interval. Data older than the time interval is not considered, e.g., an interval of 1 day would ignore all impressions and clicks older than a day when computing the CTR.

The following are all examples of CTR conditions:

1. "The CTR of listings $L_1$ is less than 1%, over the last hour"
    listings: $L_1$, within/without: within, range: 0 to 1/100, interval: 1 hour.
2. "Listings $L_2$, and $L_3$ have an aggregate CTR outside of 1% to 5% over their entire history"

listings: $L_2$, and $L_3$, within/without: without, range: 1/100 to 5/100, interval: all time.

3. "Listing $L_4$ has a CTR greater than 10% over the last week"

listing: $L_4$, within/without: without, range: 0 to 1/10, interval 1 week.

A CPC-too-high condition monitors the CPC of one or more listings. The condition is true if the CPC of any monitored listing can be reduced without reducing its rank. For example, if listing $L_1$ has a CPC of $1.23 and is at rank 4, and the listing at rank 5 has a CPC of $1.10, then the CPC of $L_1$ can be reduced to $1.11, while still ensuring that $L_1$ retains rank 4. An advertiser can also specify the size of the gap between the CPC of one its listings and the CPC of the listing below. Each CPC-too-high condition has the following parameters:

1. listings: the listings being monitored.
2. threshold: the minimum difference between the CPC of a listing and the CPC of the next worse listing.

The following are all examples of CPC-too-high conditions:

1. "Listing $L_1$ has a CPC higher than $0.05 compared to the listing below"

listings: $L_1$, threshold: $0.05

2. "Listings $L_2$ and $L_3$ have their CPC higher than $0.01 compared to the listing below"

listings: $L_2$ and $L_3$, threshold: $0.01.

An average CPC-too-high condition monitors the average CPC of one or more listings. The average CPC is the total cost of the listings divided by the total clicks for the listings. The condition is true if the average CPC of all monitored listing is higher than a threshold prescribed by the advertiser. For example, an advertiser can define a condition which is true when the average CPC of all the advertiser's listings is greater than $1.45. When starting to monitor the average CPC, there may be insufficient impressions and clicks for valid data. The marketplace operator may select a minimum number of impressions and/or clicks that are required before considering the average CPC conditions to be valid. Each average CPC-too-high condition has the following parameters:

1. listings: the listings being monitored.
2. threshold: the minimum difference between the CPC of a listing and the CPC of the next worse listing.
3. interval: the timer period for the limit, e.g., one week.

The following are all examples of average CPC-too-high conditions:

1. "Listings $L_1$ and $L_2$ have an average CPC higher than $0.35 over one day"

listings: $L_1$ and $L_2$, threshold: $0.35, interval: 1 day.

2. "All my listings have an average CPC higher than $0.98 over one week"

listings: all, threshold: $0.98, interval: 1 week.

A rank-CPC condition monitors the minimum CPC required to attain a given rank for a search term. The condition is true if a given rank can be achieved with the price threshold specified.

For example, if listing $L_4$ is at rank 4 with a CPC of $1.23 and listing $L_5$ is at rank 5 with a CPC of $1.15, then a new listing can be at rank 5 with a CPC of $1.16. It may be impossible for a new listing to be at a given rank at any price. This can happen, for example, if the CPC of $L_4$ is the same as the CPC of $L_5$. This is because listings are ordered by their CPC, and listings with the same CPC are ordered by their time-stamp (the listing with the earlier time stamp has the better rank). Any new listing will have a time stamp greater than all other listings, and so it cannot have a time stamp in between that of $L_4$ and $L_5$.

Each rank-CPC condition has the following parameters:

1. term: the term being monitored.
2. rank: the desired rank
3. threshold: the maximum price to be at the rank for term.

The following are all examples of rank-CPC conditions:

1. "rank 3 for the term 'LCD Projector' can be achieved for less than or equal to $3.50"

term: LCD Projector, rank: 3, threshold: $3.50

2. "rank 10 for the term 'Garage' can be achieved for less than or equal to $0.10"

term: Garage, rank: 10, threshold: $0.10

Notification Time(s)

The previous section described the various notification conditions and the parameters for them. Each Auto Notification specification also includes the notification time(s) for the condition, which is the time(s) at which an advertiser wishes to be notified when the condition is true. Note that the time at which an advertiser is notified is independent of the time at which a condition is true.

There are two choices when an advertiser can be notified:

1. immediately: as soon as a condition becomes true, the advertiser is notified.
2. interval: all notifications are aggregated over the specified time interval. The interval includes a period and a time, e.g., hourly at half past the hour, daily at 4:20 p.m., weekly every Friday at 3:45 p.m., etc.

If no conditions were true during the interval, then the advertiser or marketplace operator can select if no notification should be sent, or if a "no condition true" notification should be sent. Otherwise, all conditions that became true during the interval are recorded, and at the end of the interval the advertiser is notified of these.

For example, an advertiser may specify that all notifications for a position condition be sent daily. If the position of a monitored listing goes outside the limits specified multiple times during a day, then these are all recorded as they occur, and the advertiser is not sent an immediate notification. At the end of the day these are all gathered and sent to the advertiser.

Notification Mode

The previous section defined the notification time, which is the time at which an advertiser is notified of any conditions that may be true. Any such notification is transmitted in one or more possible communication modes. Each Auto Notification specification also includes the notification mode for the condition, which is the communication mode used to notify an advertiser.

There are five possible modes of communication:

1. e-mail: the notice is sent to a set of e-mail addresses prescribed by the advertiser. Each e-mail message can include details of the conditions that are/were true, and links to corrective action that an advertiser can take, e.g., a single click that authenticates the advertisers and automatically makes the corrections.
2. instant messaging: the notice is sent to a set of instant-message accounts prescribed by the advertiser. Similar to e-mail, each instant message can include the details of the conditions that are/were true, and links to corrective action that the advertiser can take.
3. fax: the notice is faxed to a number prescribed by the advertiser. The fax can include details of the conditions that are/were true, and provide pointers to where the advertiser can go to correct any undesirable conditions, e.g., pointers to the online marketplace system where the advertiser can authenticate himself and then correct any undesirable conditions online.

4. page: the notice is paged to a number prescribed by the advertiser. A page is a text or other message sent by radio communication to a portable wireless receiver. The page may be sent through a paging system to a dedicated paging receiver or transceiver, or the page may be sent using a short message service (SMS) operated in conjunction with some cellular radiotelephone systems. The page can provide a brief indication of the conditions that are/were true, and a pointer to the where the advertiser can go to correct any undesirable conditions, e.g., a phone number the advertiser can call.

5. phone: the notice is sent to a number prescribed by the advertiser. An automated voice synthesis system can be used to alert the advertiser to the conditions that are/were true. The phone means can offer corrective actions in a menu with touch-tone inputs, e.g., "press 1 to increase your bid to one dollar and thirty two cents to regain position 1, press 2 to . . . " The system may recognize voice inputs directly. The message can also include pointers to where the advertiser can go to correct any undesirable conditions, e.g., pointers to the online marketplace system.

Notification Action Type

For each Auto Notification function, an advertiser specifies the condition, notification time, and notification mode. Auto Notification functions also include the notification action type, which is the method that the advertiser can use to correct any undesirable conditions. The actions to correct the condition can be included with the notification, or the notification function can include other instructions to make the corrections. There are six action types:

1. active links: these are links that are embedded in the notification, which allow the advertiser to correct the undesirable condition in one click. Preferably, the advertiser is first authenticated before any action is taken. The links can be embedded URLs in an e-mail message, that in one click correct an undesirable condition. For example, a link may be titled "Click here to increase the CPC of the following listing to $1.43 to restore it to rank 3." The URL of the link points to market operator's system, and includes information about the advertiser and the condition(s) to be corrected. If the advertiser clicks on the link, his identity is verified, and the system performs all the corrective actions automatically without requiring the advertiser to interact with the online marketplace system directly.

It is applicable to include active links in e-mail notifications and instant messaging notifications.

2. inactive links: these are pointers to online locations where an advertiser can go to correct any undesirable conditions. For example, this can be a phone message with a pointer to the URL for the online marketplace system where the advertiser can log in. Once logged in, the advertiser may be presented with a page with active links to correct any undesirable conditions.

It is applicable to include inactive links in all notification modes.

3. e-mail: this is an e-mail template that an advertiser can fill out, indicating what corrective actions (if any) are to be taken, and then e-mail to the address prescribed by the marketplace operator. The template may be included in a notification (e.g., an e-mail notification), or it could be made available through other means, e.g., a web site.

It is applicable to include e-mail links in all notification modes.

4. phone: this is a pointer to a phone number that the advertiser can call to take corrective action. This may be a fully automated system, e.g., with a touch-tone phone and voice recognition, a system with a human operator, or some combination of these.

It is applicable to include phone links in all notification modes.

5. auto-correct: the advertiser is asking the system to automatically take corrective action on his behalf if this condition becomes true. The advertiser also specifies the specifics of the corrective action. This option is only applicable to conditions that can be corrected. For example, an auto-correct action type may instruct the system to add $500 to the advertiser's account balance, if it gets below the threshold, by automatically charging his credit card.

6. relax: the advertiser is asking the system to ignore the current condition, and wants to relax the condition so that this occurrence will not trigger the condition. The marketplace and/or the advertiser can choose how to relax the condition. For example, an advertiser may not care that his listing has fallen to rank 3 from rank 2, but he does want to be notified if it falls further.

Every notification function can include one or more applicable action types in it. Some action types may not be applicable with some notification modes, e.g., it may not be convenient to include a URL pointer in a phone message. An advertiser may also specify which action types he prefers in a notification.

The advantage of the Auto Notification system is to implement the following instructions on behalf of participating advertisers:

1. Allow me to specify my notification condition(s), notification time(s), notification modes, and notification action types.
2. Continually monitor all my conditions to see if any of them are true.
3. If any of my conditions become true, make a note of the details of this.
4. Send me notifications at the notification time(s) I have specified, if any of my conditions are/were true.
5. In each notification include all applicable action types to correct any conditions (that can be corrected). Restrict the action types to those that I have specified I prefer. If I have not given any preferences the marketplace operator may chose to include some or all of the action types with each notification.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

Methods and systems for generating a pay-for-performance search result determined by a site promoter, such as an advertiser, over a client/server based computer network system are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
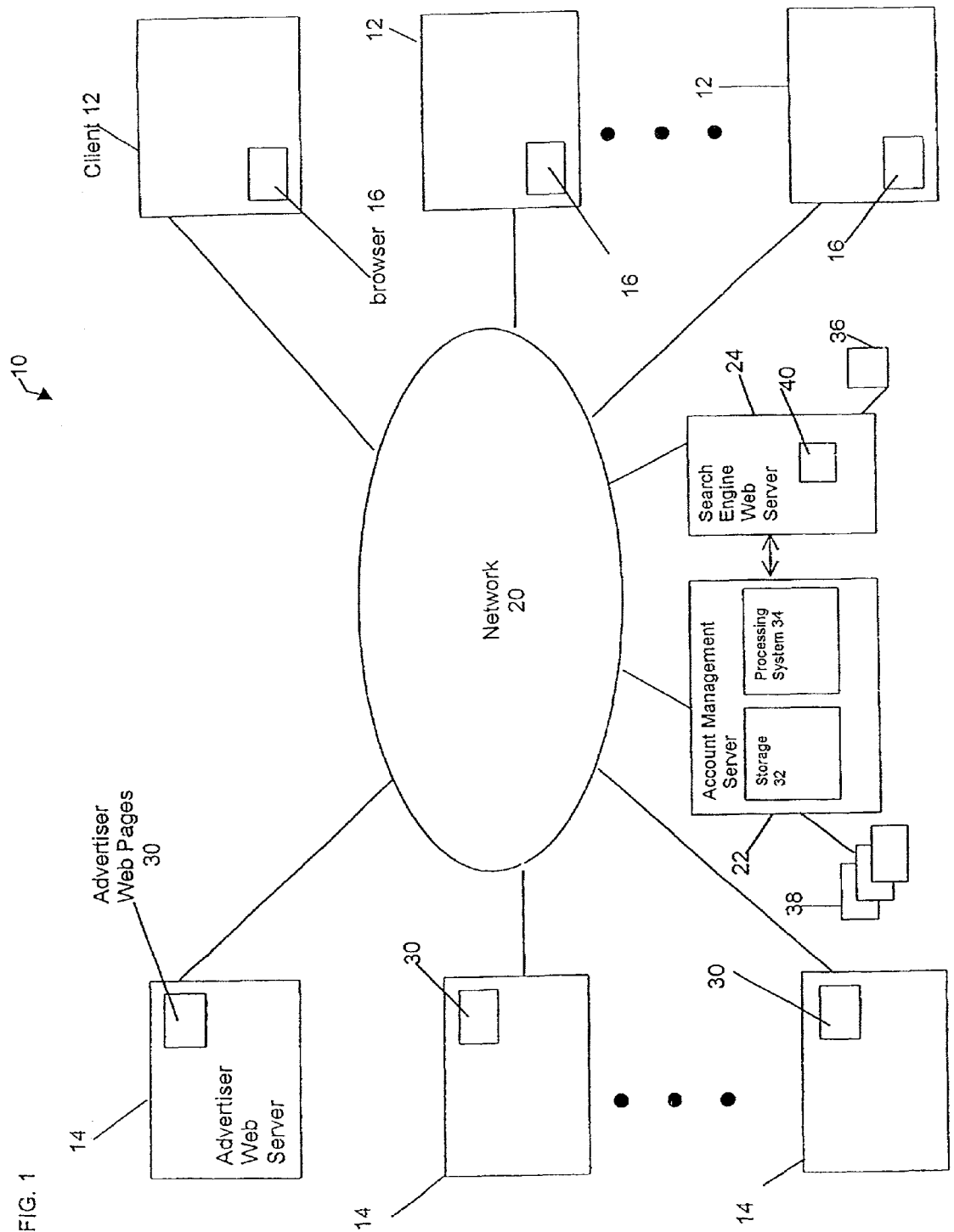
FIG. 1 is a block diagram illustrating the relationship between a large network and one embodiment of the system and method for generating a pay-for-performance search result of the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the NAVIGATOR, EXPLORER, or MOSAIC browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TELNET, and a number of other protocols known in the art, may be used. Preferably, search engine server 24, account management server 22, and advertiser servers 14 are located on the World Wide Web.

As discussed above, at least two types of server are contemplated in a preferred embodiment of the present invention. The first server contemplated is an account management server 22 comprising a computer storage medium 32 and a processing system 34. A database 38 is stored on the storage medium 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server transmits this list, in the form of a web page, to the network user, where it is displayed on the browser 16 running on the client computer 12. A presently preferred embodiment of the search engine web server may be found by navigating to the web page at URL http://www.goto.com/. In addition, the search result list web page, an example of which is presented in FIG. 7, will be discussed below in further detail.

Search engine web server 24 is connected to the Internet 20. In a preferred embodiment of the present invention, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processor 34 of account management server 22, where the computer program will evaluate the search term and corresponding web site according to a set of predefined editorial rules.

The higher bids receive more advantageous placement on the search result list page generated by the search engine 24 when a search using the search term bid on by the advertiser is executed. In a preferred embodiment of the present invention, a bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 18 located on advertiser web servers 14. In a preferred embodiment of the present invention, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database 40 by an editorial team. Most preferably, the non-paid listings follow the paid advertiser listings on the search results page.

Figure 2:
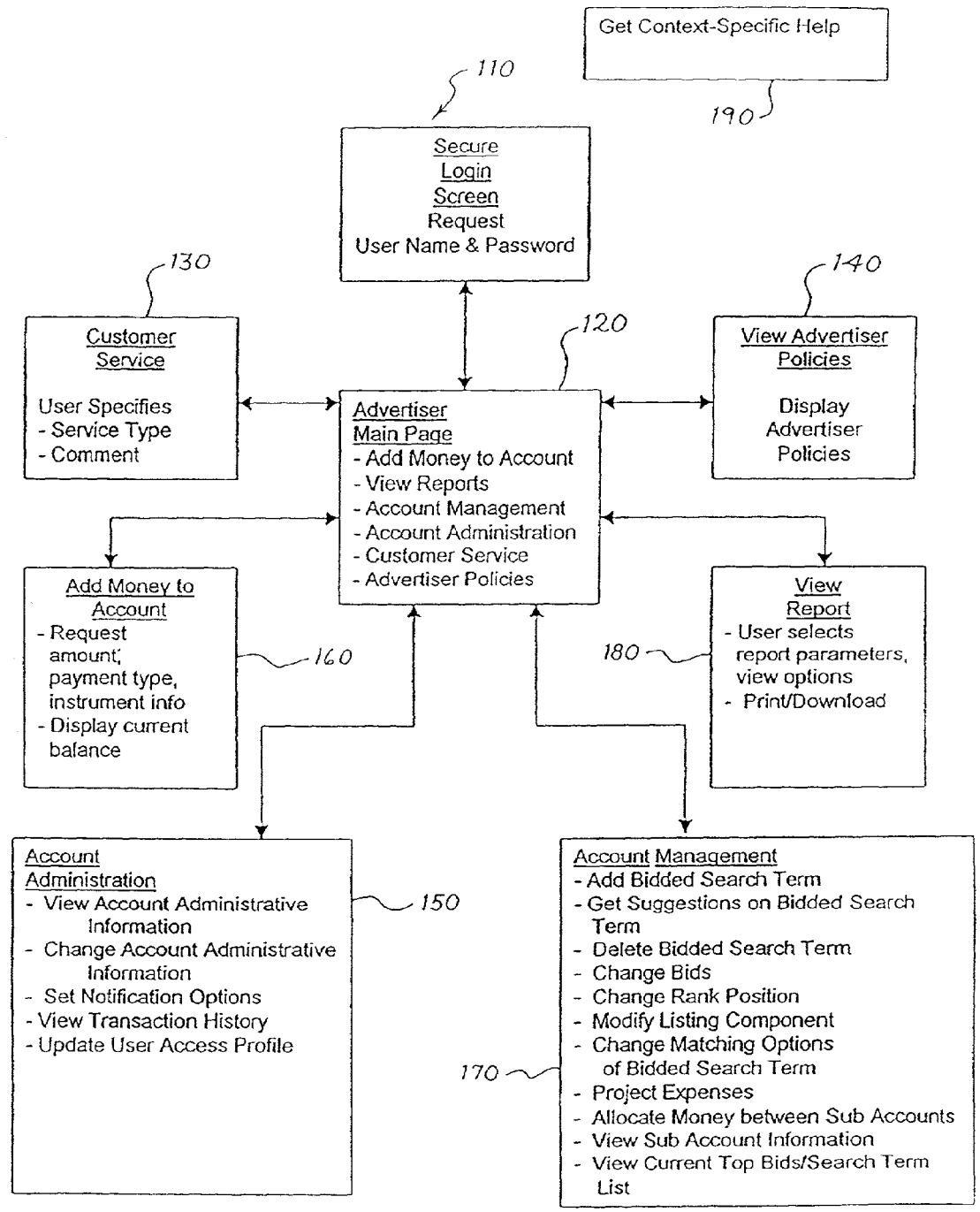
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request. In one embodiment of the present invention, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options.

Figure 3:
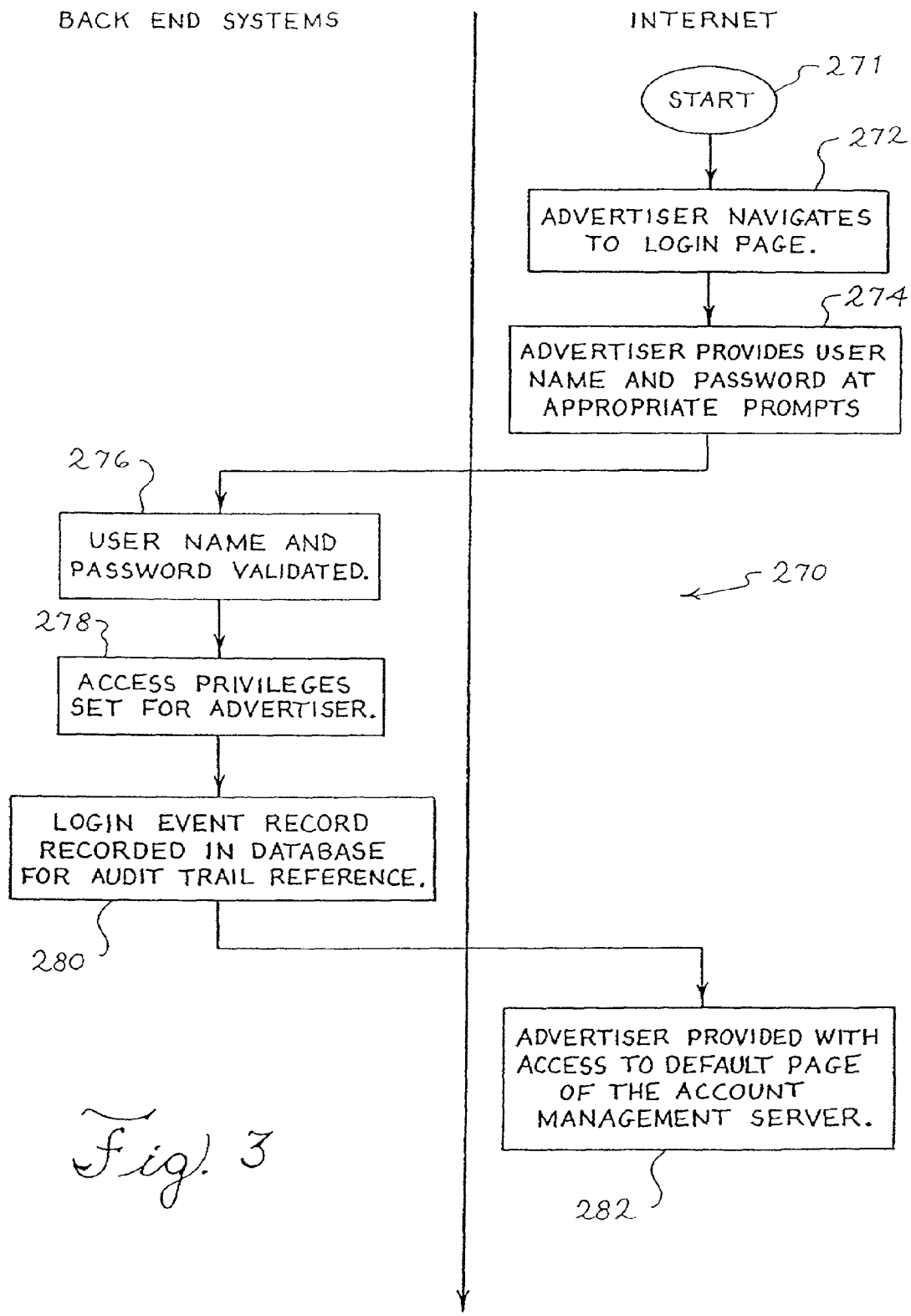
FIG. 3 is a flow chart illustrating the advertiser user login process performed in one embodiment of the present invention.
Figure 4:
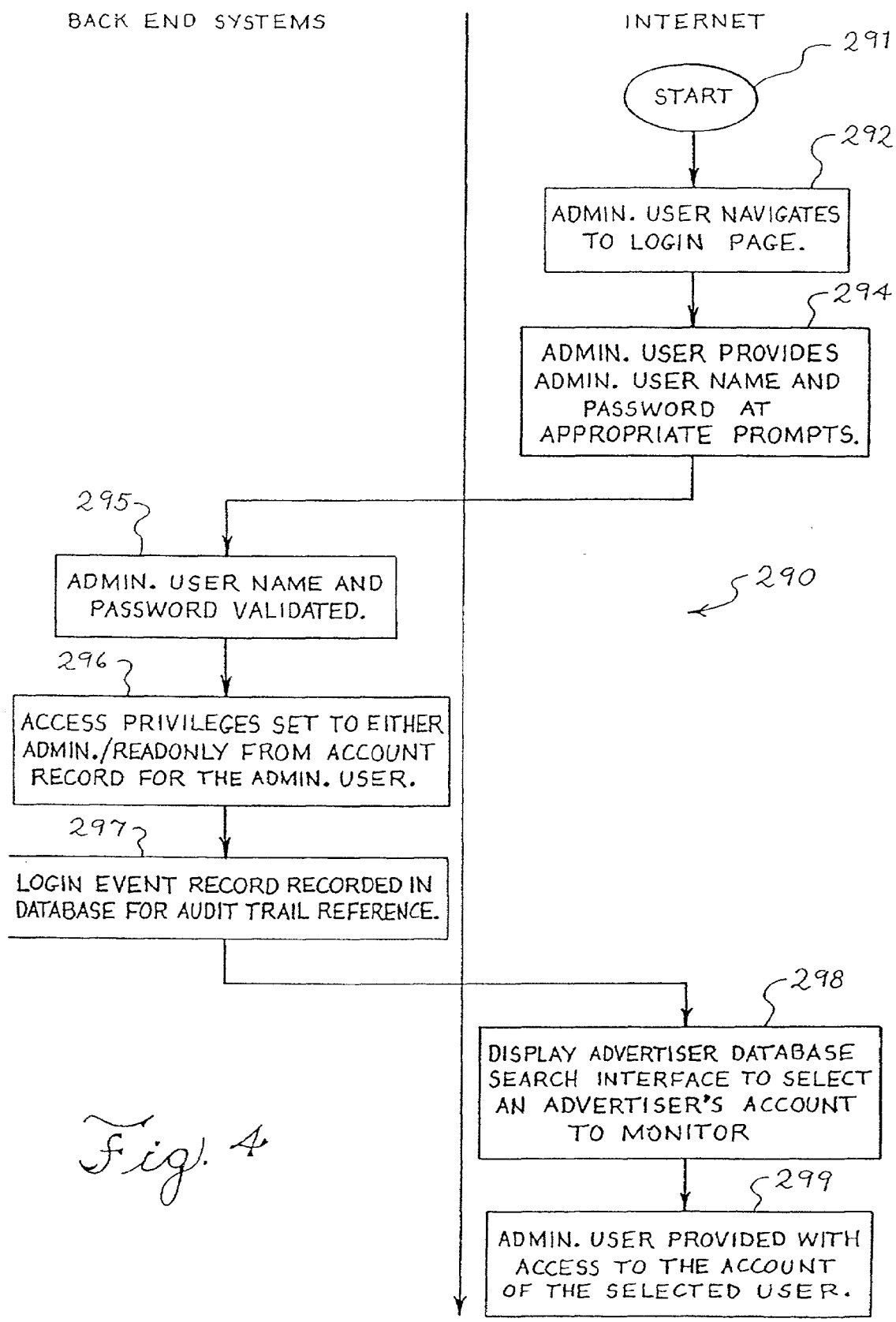
FIG. 4 is a flow chart illustrating the administrative user login process performed in one embodiment of the present invention.

The login procedure of the preferred embodiment of the present invention is shown in FIGS. 3 and 4 for two types of user. FIG. 3 shows the login procedures 270 for an advertiser. FIG. 4 shows the login procedures 290 for an administrator managing and maintaining the system and method of the present invention. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 296 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertiser's account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrator's account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor. For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present invention.

Figure 5:
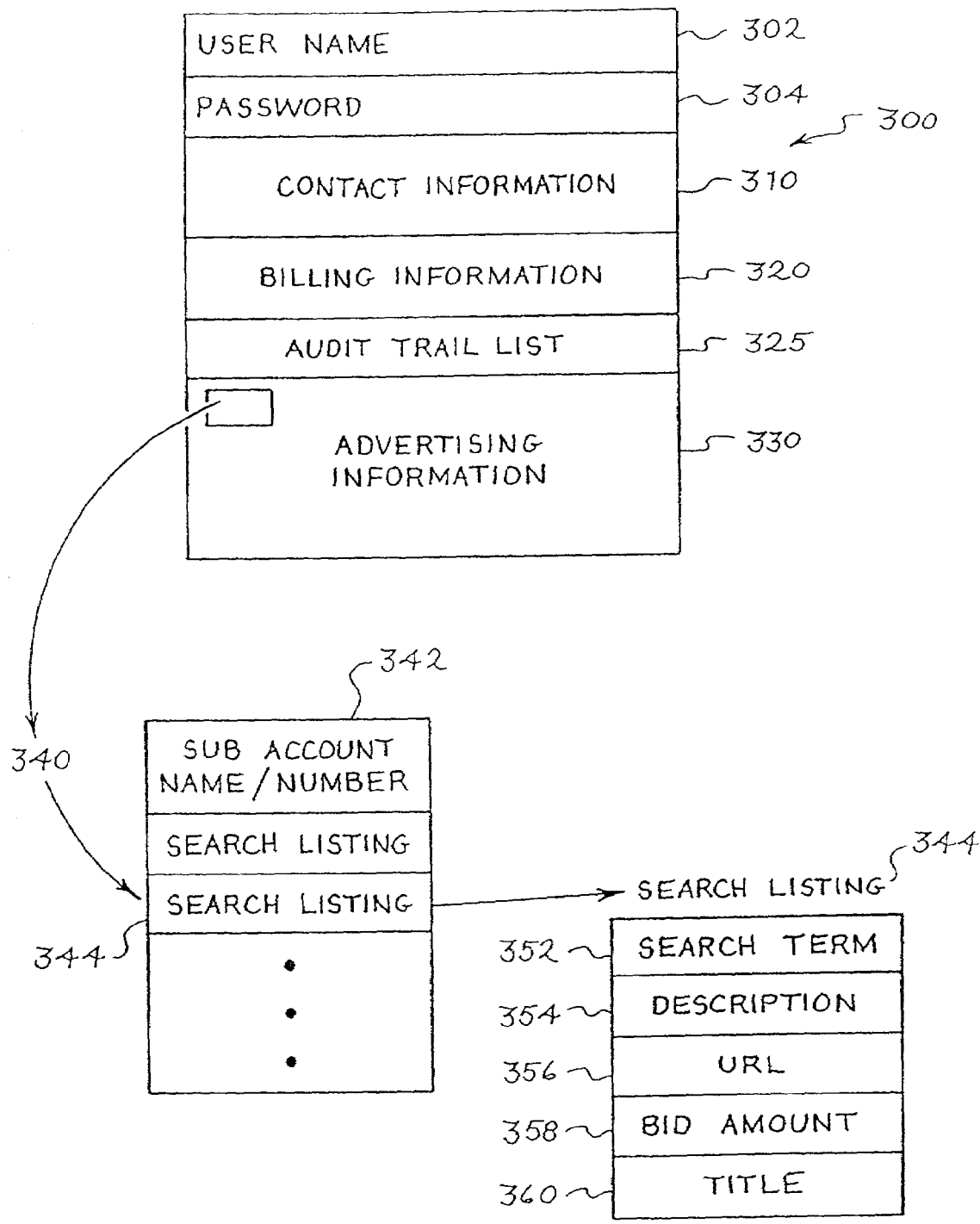
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310 (e.g., contact name, company name, street address, phone, e-mail address).

Contact information 310 is preferably utilized to direct communications to the advertiser when the advertiser has requested notification of key advertiser events under the notification option, discussed below. The account record 300 also contains billing information 320 (e.g., current balance, credit card information). The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information section 330 contains information needed to conduct the online bidding process of the present invention, wherein a position is determined for a web site description and hyperlink within a search result list generated by a search engine. The advertising data 330 for each user account 300 may be organized as zero or more subaccounts 340. Each subaccount 340 comprises at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the present invention. Alternatively, the advertising information section need not include the added organizational layer of subaccounts, but may simply comprise one or more search listings.

The search listing 344 corresponds to a search term/bid pairing and contains key information to conduct the online competitive bidding process. Preferably, each search listing comprises the following information: search term 352, web site description 354, URL 356, bid amount 358, and a title 360. The search term 352 comprises one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

The web site description 354 is a short textual description (preferably less than 190 characters) of the content of the advertiser's web site and may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed above. The URL may also be displayed as part of the advertiser's entry in a search result list.

The bid amount 358 preferably is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. Finally, a rank value is a value generated dynamically, preferably by the processing system 34 of the account management server 22 shown in FIG. 1, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value, and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect (e.g., "All search listing descriptions must clearly relate to the search term").

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded search terms, or changing a bid amount). Additional routines may be implemented to permit advertisers to display a history of transactions of a specified type, or that occur within a specified time. The transaction information may be obtained from the audit trail list 325 of FIG. 5, described above. Clickable buttons that may be implemented in software, web-based forms, and/or menus may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended (meaning the advertiser's listings will no longer appear in search result lists). Another key event for which the advertiser may wish notification is a change in position of an advertiser's listing in the search result list generated for a particular search term. For example, an advertiser may wish to have the system send a conventional electronic mail message to the advertiser if the advertiser has been outbid by another advertiser for a particular search term (meaning that the advertiser's listing will appear in a position farther down on the search result list page than previously). When one of the system-specified key events occurs, a database search is triggered for each affected search listing. The system will then execute the appropriate notification routine in accordance with the notification options specified in the advertiser's account.

Referring back to FIG. 2, a selection also appears in menu 120 that permits an advertiser to add money to the advertiser's account, so that the advertiser will have funds in their account to pay for referrals to the advertiser's site through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the search engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In the preferred embodiment of the present invention, an advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards, in a manner similar to that set forth in U.S. Pat. No. 5,724,424 to Gifford. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address). In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,836,241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertiser's billing information, and appends the billing information to the advertiser's payment history. The advertiser's updated billing information is stored to the persistent state (e.g., the account record database) from the temporary instance.

Within the function invoked at step 612, a credit card payment function may be invoked by the system at step 614. In an alternate embodiment of the present invention, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just completed credit card transaction.

In an alternate embodiment of the present invention, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

Figure 6:
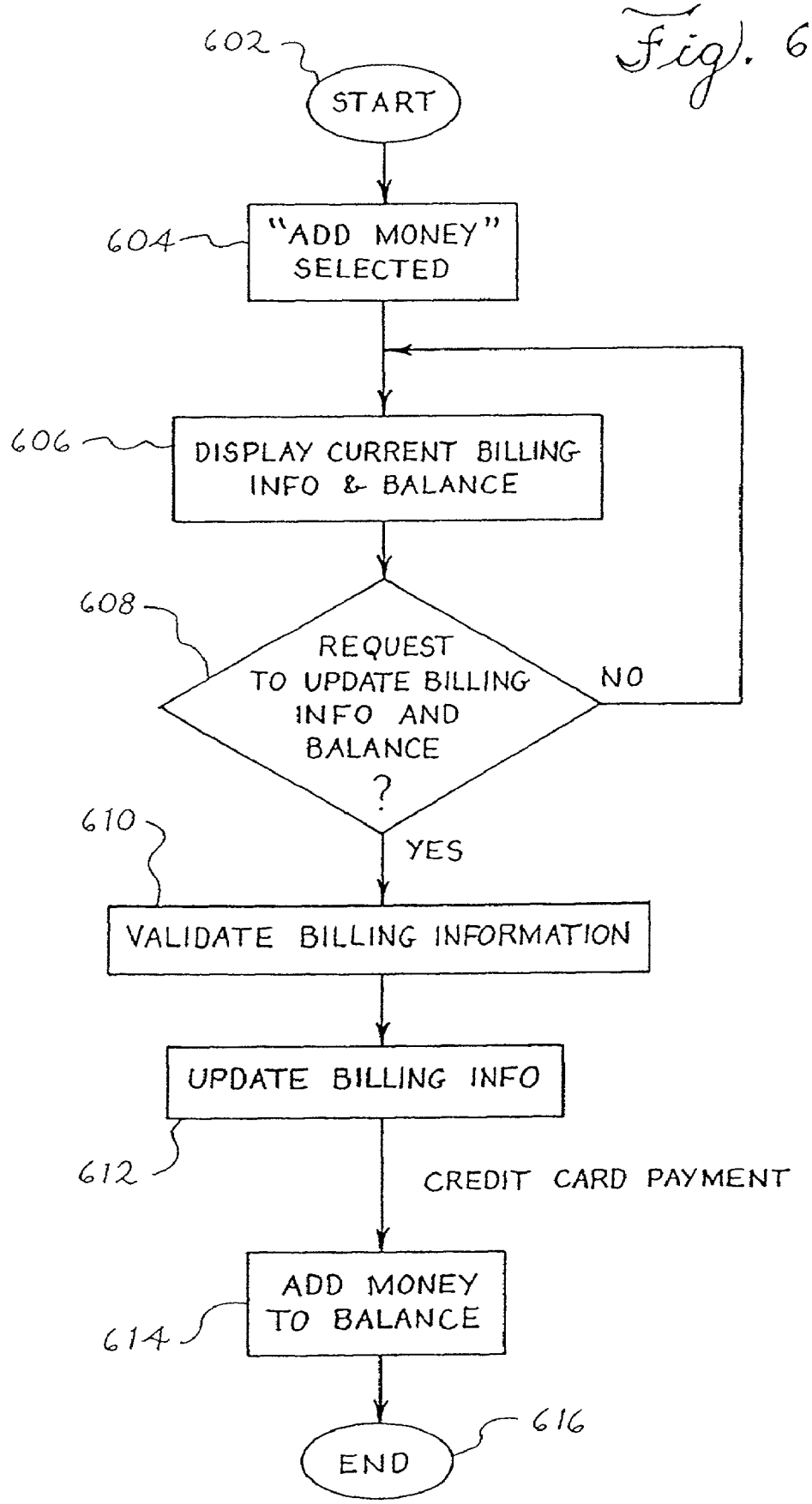
FIG. 6 is a flow chart illustrating a method of adding money to an account record used in one embodiment of the present invention.

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account management server 22. Finally, internationalization methodologies may be employed to refine searches for users outside the United States. For example, country or language-specific search results may be generated, by a cross-reference of the advertiser account database, for example.

Figure 7:
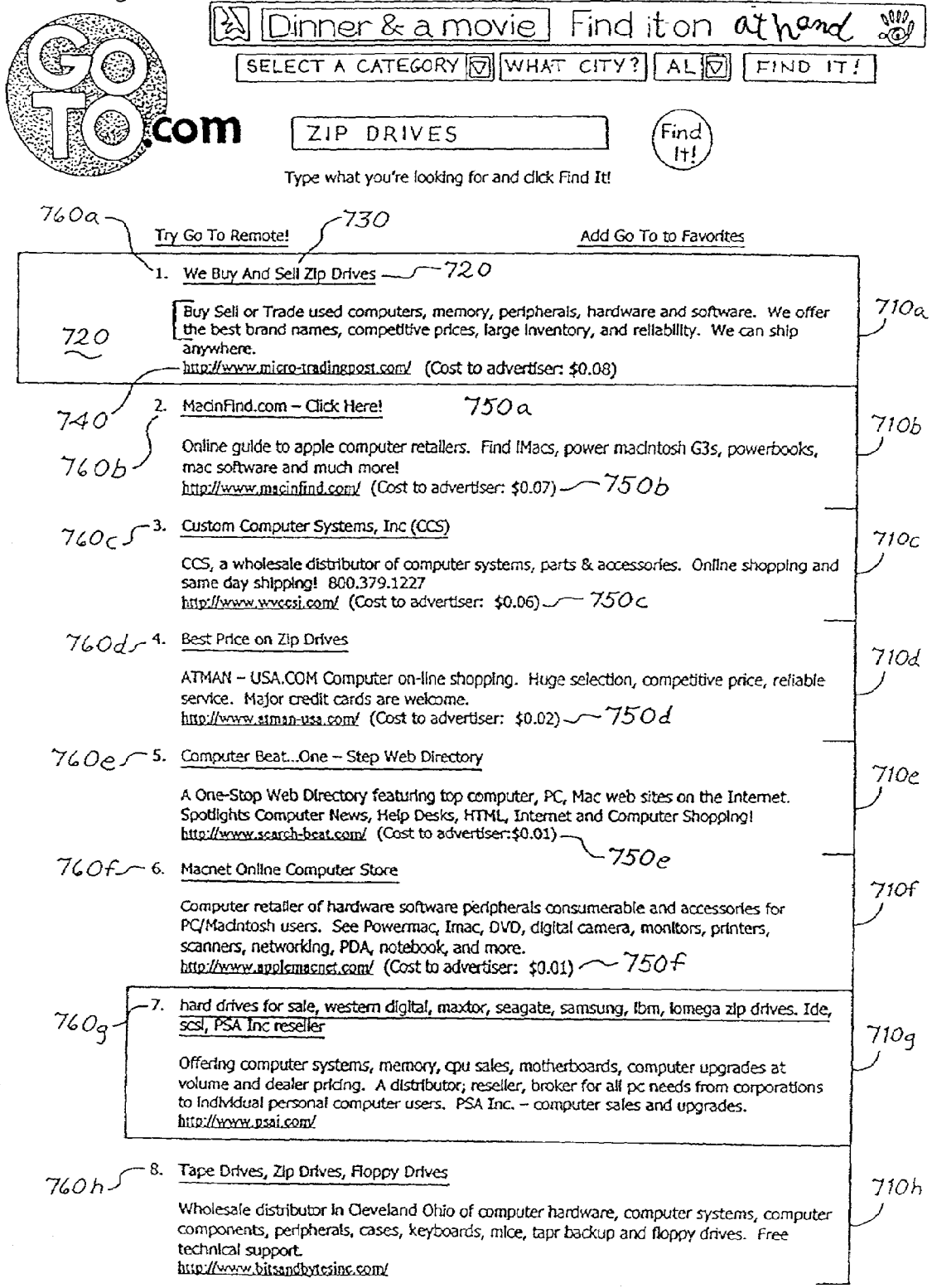
FIG. 7 illustrates an example of a search result list generated by one embodiment of the present invention.

An example of a search result list display used in an embodiment of the present invention is shown in FIG. 7, which is a display of the first several entries resulting from a search for the term "zip drives". As shown in FIG. 7, a single entry, such as entry 710a in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710a, as shown in FIG. 7. The "click through" of a search result item occurs when the remote searcher viewing the search result item display 710 of FIG. 7 selects, or "clicks" on the hyperlink 730 of the search result item display 710. In order for a "click through" to be completed, the searcher's click should be recorded at the account management server and redirected to the advertiser's URL via the redirect mechanism discussed above.

Search result list entries 710a–710h may also show the rank value of the advertiser's search listing. The rank value is an ordinal value, preferably a number, generated and assigned to the search listing by the processing system 34 of FIG. 1. Preferably, the rank value is assigned through a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value and bid amount is illustrated in FIG. 7, where each of the paid search list entries 710a through 710f display the advertiser's bid amount 750a through 750f for that entry. Preferably, if two search listings having the same search term also have the same bid amount, the bid that was received earlier in time will be assigned the higher rank value. Unpaid listings 710g and 710h do not display a bid amount and are displayed following the lowest-ranked paid listing. Preferably, unpaid listings are displayed if there are an insufficient number of listings to fill the 40 slots in a search results page. Unpaid listings are generated by a search engine utilizing objective distributed database and text searching algorithms known in the art. An example of such a search engine may be operated by Inktomi Corporation. The original search query entered by the remote searcher is used to generate unpaid listings through the conventional search engine.

Figure 8:
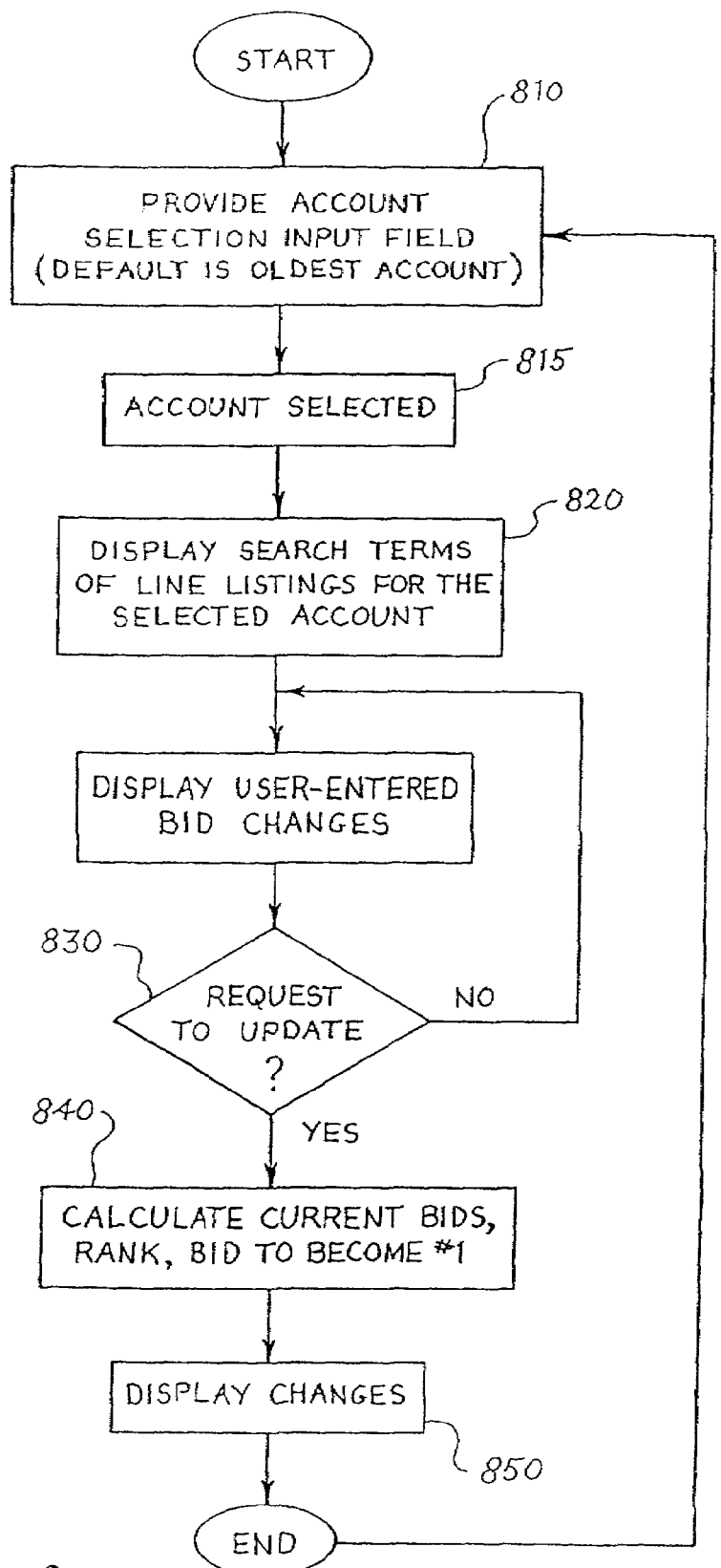
FIG. 8 is a flow chart illustrating a change bids process used in one embodiment of the present invention.

As shown in the campaign management menu 170 of FIG. 2, several choices are presented to the advertiser to manage search listings. First, in the "Change Bids" selection, the advertiser may change the bid of search listings currently in the account. The process invoked by the system for the change bids function is shown in FIG. 8. After the advertiser indicates the intent to change bids by selecting the "Change Bids" menu option, the system searches the user's account in the database and displays the search listings for the entire account or a default subaccount in the advertiser's account, as shown in step 810. Search listings may be grouped into subaccounts defined by the advertiser and may comprise one or more search listings. Only one subaccount may be displayed at a time. The display should also preferably permit the advertiser to change the subaccount selected, as shown in step 815. The screen display will then show the search listings for the selected subaccount, as indicated in step 820.

Figure 9:
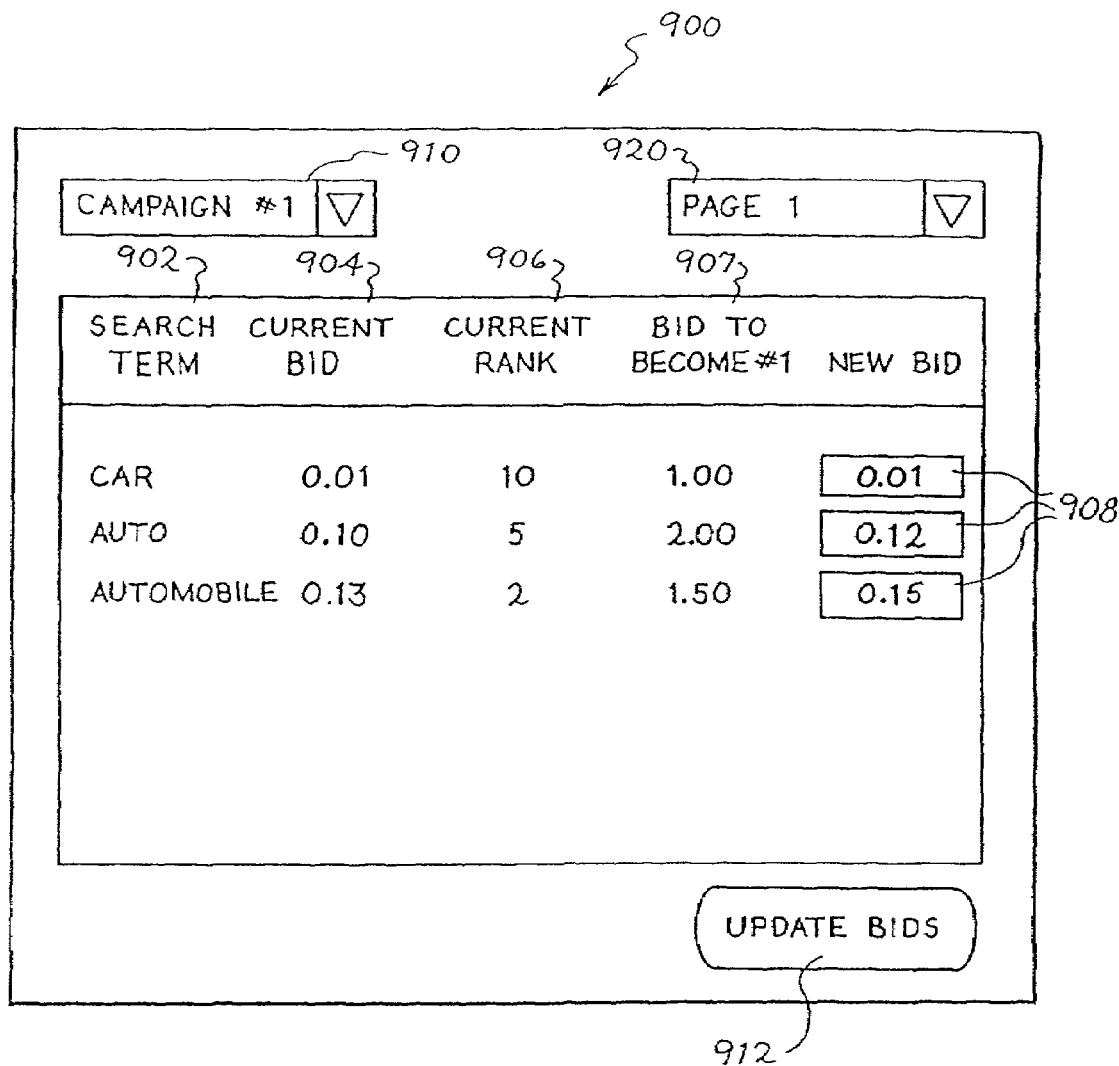
FIG. 9 illustrates an example of a screen display used in the change bids process of FIG. 8.

An example of screen display shown to the advertiser in step 810 is shown in FIG. 9 and will be discussed below. To change bids, the advertiser user may specify new bids for search terms for which the advertiser already has an existing bid by entering a new bid amount into the new bid input field for the search term. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid amounts for every search listing displayed, the rank values, and the bid amount needed to become the highest ranked search listing matching the search term field. Preferably, the system then presents a display of changes at step 850. After the user confirms the changes, the system updates the persistent state by writing the changes to the account in the database.

The search listing data is displayed in tabular format, with each search listing corresponding to one row of the table 900. The search term 902 is displayed in the leftmost column, followed by the current bid amount 904, and the current rank 906 of the search listing. The current rank is followed by a column entitled "Bid to become #1" 907, defined as the bid amount needed to become the highest ranked search listing for the displayed search term. The rightmost column of each row comprises a new bid input field 908 which is set initially to the current bid amount.

As shown in FIG. 9, the search listings may be displayed as "subaccounts." Each subaccount comprises one search listing group, with multiple subaccounts residing within one advertiser account. Each subaccount may be displayed on a separate display page having a separate page. The advertiser should preferably be able to change the subaccount being displayed by manipulating a pull-down menu 910 on the display shown in FIG. 9. In addition, search listing groups that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed search listing by entering a new bid amount into the new bid input field 908 for the search listing. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field would be replaced by a "New Rank" field, in which the advertiser enters the new desired rank position for a search term. After the advertiser requests that the ranks be updated, the system then calculates a new bid price by any of a variety of algorithms easily available to one skilled in the art. For example, the system may invoke a routine to locate the search listing in the search database having the desired rank/search term combination, retrieve the associated bid amount of said combination, and then calculate a bid amount that is N cents higher; where N=1, for example. After the system calculates the new bid price and presents a read-only confirmation display to the advertiser, the system updates the bid prices and rank values upon receiving approval from the advertiser.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a search listing via web-based forms set up for each search listing. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state (e.g., the user account database) after the advertiser approves the changes.

A process similar to those discussed above may be implemented for changing any other peripheral options related to a search listing; for example, changing the matching options related to a bidded search term. Any recalculations of bids or ranks required by the changes may also be determined in a manner similar to the processes discussed above.

In the "Delete Bidded Search Term" option, the system retrieves all of the search listings in the account of the advertiser and displays the search listings in an organization and a format similar to the display of FIG. 9. Each search listing entry may include, instead of the new bid field, a check box for the advertiser to click on. The advertiser would then click to place a check (X) mark next to each search term to be deleted, although any other means known in the art for selecting one or more items from a list on a web page may be used. After the advertiser selects all the search listings to be deleted and requests that the system update the changes, the system preferably presents a read-only confirmation of the requested changes, and updates the advertiser's account only after the advertiser approves the changes. The "deleted" search listings are removed from the search database 36 and will not appear in subsequent searches. However, the search listing will remain as part of the advertiser's account record for billing and account activity monitoring purposes.

In the "Add Bidded Search Term" option, the system provides the advertiser with a display having a number of entry fields corresponding to the elements of a search listing. The advertiser then enters into each field information corresponding to the respective search listing element, including the search term, the web site URL, the web site title, the web site description, and the bid amount, as well as any other relevant information. After the advertiser has completed entering the data and has indicated thus to the system, the system returns a read-only confirmation screen to the advertiser. The system then creates a new search listing instance and writes it into the account database and the search database upon receiving approval from the advertiser.

Preferably, the "Account Management" menu 170 of FIG. 2 provides a selection for the advertiser to "Get Suggestions On Bidded Search Term". In this case, the advertiser enters a bidded search term into a form-driven query box displayed to the advertiser. The system reads the search term entered by the advertiser and generates a list of additional related search terms to assist the advertiser in locating search terms relevant to the content of the advertiser's web site. Preferably, the additional search terms are generated using methods such as a string matching algorithm applied to a database of bidded search terms and/or a thesaurus database implemented in software. The advertiser may select search terms to bid on from the list generated by the system. In that case, the system displays to the advertisers the entry fields described above for the "Add Bidded Search Term" selection, with a form for entering a search listing for each search term selected. Preferably, the selected search term is inserted as a default value into the form for each search listing. Default values for the other search listing components may also be inserted into the forms if desired.

The "Account Management" menu 170 of FIG. 2 also preferably provides advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month (or other specified time period) for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

One embodiment of the present invention bases the cost projection algorithm on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View Search Term List" selection displays the list of the advertiser's selected search terms along with the corresponding URLs, bid price, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page 120 of FIG. 2. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions (times that the search listing appeared in a search result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, a preferred embodiment of the present invention implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

FIGS. 10–24 are flow diagrams illustrating procedures which may be used to implement an automatic notification functionality to the system described above. In accordance with the automatic notification functionality, an advertiser who has one or more associated search listings stored in a search listings database may specify one or more conditions related to the one or more search listings. When a condition becomes true or the automatic notification functionality is otherwise actuated, a notification is sent to the advertiser. The advertiser may respond in any appropriate manner or not respond at all. The automatic notification is an independent feature under the advertiser's control which operates automatically on behalf of the advertiser to advise the advertiser of status information about search listings of the advertiser.

One embodiment is implemented as a notification method in a computer database system. The method includes receiving a notification instruction from an owner associated with a search listing stored in the computer database system. The owner in one embodiment is an advertiser who is associated with a marketplace operator who owns, operates and maintains the computer database system. One particular embodiment of the method is practiced in conjunction with a database system accessible via the World Wide Web. In this exemplary embodiment, the search listing is one stored in the database search system and accessible by a search engine in response to a search query submitted by a third party searcher. Information about the search listing is presented to the searcher along with other search results. Factors such as the cost charged to the owner and the display rank of the search listing may be controlled by information contained in the notification instruction.

The notification instruction may be received at the computer database system in any suitable fashion. In one particular embodiment, the notification instruction is received when the owner or advertiser accesses a World Wide Web page of the marketplace operator and specifies one or more conditions and associated data states about which the owner should be automatically notified.

The notification method further includes monitoring conditions specified by the notification instruction for the search listing. Exemplary conditions include those specified herein and their equivalents. In particular, exemplary conditions include conditions related to a variable state of the search listing such as its associated cost and display rank. Other exemplary conditions include economic conditions such as an account balance of the owner or advertiser with the marketplace operator.

The notification method further includes sending a notification to the owner upon detection of a changed condition of the search listing. The notification may be communicated in any convenient way or combination of ways. The notification may include built-in information for responding to the notification, so that the condition can be corrected.

Another embodiment is implemented as a database search system. The database search system includes a database of search listings associated with advertisers. Each advertiser may initiate and maintain one or more search listings. The search listings may be search to produce search results. The database search system further includes a processing system which sends a notification to an advertiser when a change condition of a search listing of the advertiser has occurred. The change condition may be specified by the advertiser or may be a default or other operator-specified condition. In one embodiment, the change condition is identified by the advertiser and threshold values or limits are specified by the advertiser. The state of the condition is preferably automatically tracked or monitored until a change in the condition is detected. Subsequently, a notification is sent to the advertiser to alert of the change or some other action is taken by the system.

Another embodiment is implemented as a database search system which includes a database of search listings. Each search listing is associated with an advertiser. The database search system further includes a search engine. Still further, the database search system includes means responsive to condition specifying information from one or more advertisers for providing an indication to an advertiser when a specified condition of one or more search listings is satisfied.

The condition specifying information may be received from the one or more advertisers, may be a default or may be otherwise selected or specified or designated by an advertiser or others. The specified condition is tracked in a manner which may be appropriately chosen or specified depending on the condition and its nature. The indication may be of any sort or nature needed to communicate to the advertiser or some device or instrument associated with the advertiser that the specified condition is satisfied. The indication may be as simple as turning on or off some indicator or taking some action or failing to take some action. The presence or absence of the indicator or action may serve to communicate the condition to an advertiser. The indication may be more involved, such as a visual or audible communication conveyed to the advertiser with a built-in or automatic response.

Another embodiment is implemented as a database search system. The database search system includes in this embodiment a database of search listings. Each search listing is associated with a respective advertiser and each search listing includes a search term and a variable cost per click (CPC) or a variable display rank. The database search system in this embodiment further includes a search engine configured to identify search listings matching a search query received from a searcher. The matching search listings are preferably ordered in a search result list according to the display rank and the bid amount of the matching search listings. An agent is responsive to a condition definition from an advertiser to provide condition update information to the advertiser. The condition definition specifies a condition to be monitored. The condition update information, if present, specifies the circumstances under which the condition will be updated.

Another embodiment is implemented as a method for operating a database search system. In this embodiment, the method includes storing a plurality of search listings in a database. Each search listing is associated with an advertiser who gives economic value when a search listing is referred to a searcher. The method further includes determining a display position for associated search listings. In one example, the associated search listing are associated by common data, such as a search term or proximity to a search term. The display position may be determined in any appropriate way, from ways which are completely deterministic to ways which are completely random. The position determining way may be based on advertiser input or some other information. In one embodiment, each search listing is assigned a cost per click (CPC) and the display position is determined based on CPC, with the highest CPC listing for a search term being listed highest when that search term or a variant thereof is received. The method further includes receiving from an advertiser an indication of search listings for which the advertiser desires a notification of a display position change. The indication and the notification may be sent according to any suitable communication method any available, convenient communication channel.

The procedures illustrated in FIGS. 10–24 may be performed in software or hardware or any combination of these. In one embodiment, the procedures are initiated as software procedures running on the processing system 34 of the account management server 22 (FIG. 1). In other embodiments, the procedures may run on a separate machine with network access to the search listings database. The procedures together form an Auto Notification function.

The procedures illustrated in FIGS. 10–24 implement a notification method in a computer database system. The method includes acts such as receiving a notification instruction from an owner associated with a search listing stored in the computer database system, monitoring conditions specified in the notification instruction for the search listing, and sending a notification to the owner upon detection of a changed condition of the search listing.

In one embodiment, the computer database system is a pay for performance search system as described herein and includes a database of search listings and a search engine. The search listings are each associated with an advertiser or owner of the search listing. The search listings each include data such as a search term, a bid amount or maximum cost per clickthrough specified by the advertiser, a cost per clickthrough (CPC) and a rank or display rank. The CPC and the rank may be varied automatically depending on values specified by the advertiser and by other advertisers associated with search listings that include the same search term. For example, the system may automatically reduce the CPC of a listing to a minimum while still maintaining a specified rank. The search engine matches search terms or other portions of the search listings with a search query received from a searcher. The matching search listings are organized according to CPC and display rank and returned to the searcher. If a search listing is referred to the searcher, an economic value of an amount equal to the CPC is payable by the advertiser or owner, who may keep an account for this purpose. A referral of a search listing in this case might be an impression, such as including information about the search listing in the display results, a click through by the searcher, or some post-click through action by the searcher. This embodiment is exemplary only. The notification method may be applied to other types of database search systems as well for advising owners or others associated with listings in a database of a changed condition of a search listing.

One example of a changed condition which may be notified to the owner include a change of position of a search listing among the search results produced for a particular search term. Another example of a changed condition is when the CPC for a search listing reaches some value or range specified by the advertiser or owner. Another example of a changed condition is when the owner's account balance falls below an owner-specified amount. Another example of a changed condition is when aggregate impressions for one or more of the advertiser's search listings exceed a specified number, or when aggregate clickthroughs exceed a specified number, or when the clickthrough rate over some specified time period exceeds a specified number. Another example of a changed condition occurs when the CPC of any search listing can be reduced without impacting its rank among other search listings for the same search term. Another example of a changed condition occurs when a search listing can be at an advertiser specified display rank for less than an advertiser specified CPC. Another example of a changed condition is when an advertisers average CPC across some collection of listings exceeds a predetermined threshold.

In one embodiment, the advertiser can select timing of the notifications sent by the system. Further, in one embodiment, the advertiser can specify the nature of the notification sent by the system, such as an electronic mail message, a facsimile, a page or a short or instant message. Still further, in one embodiment, the notification may include active links, inactive links or email responses specifying an action to be taken by the system to correct or resolve the notified condition.

Figure 10:
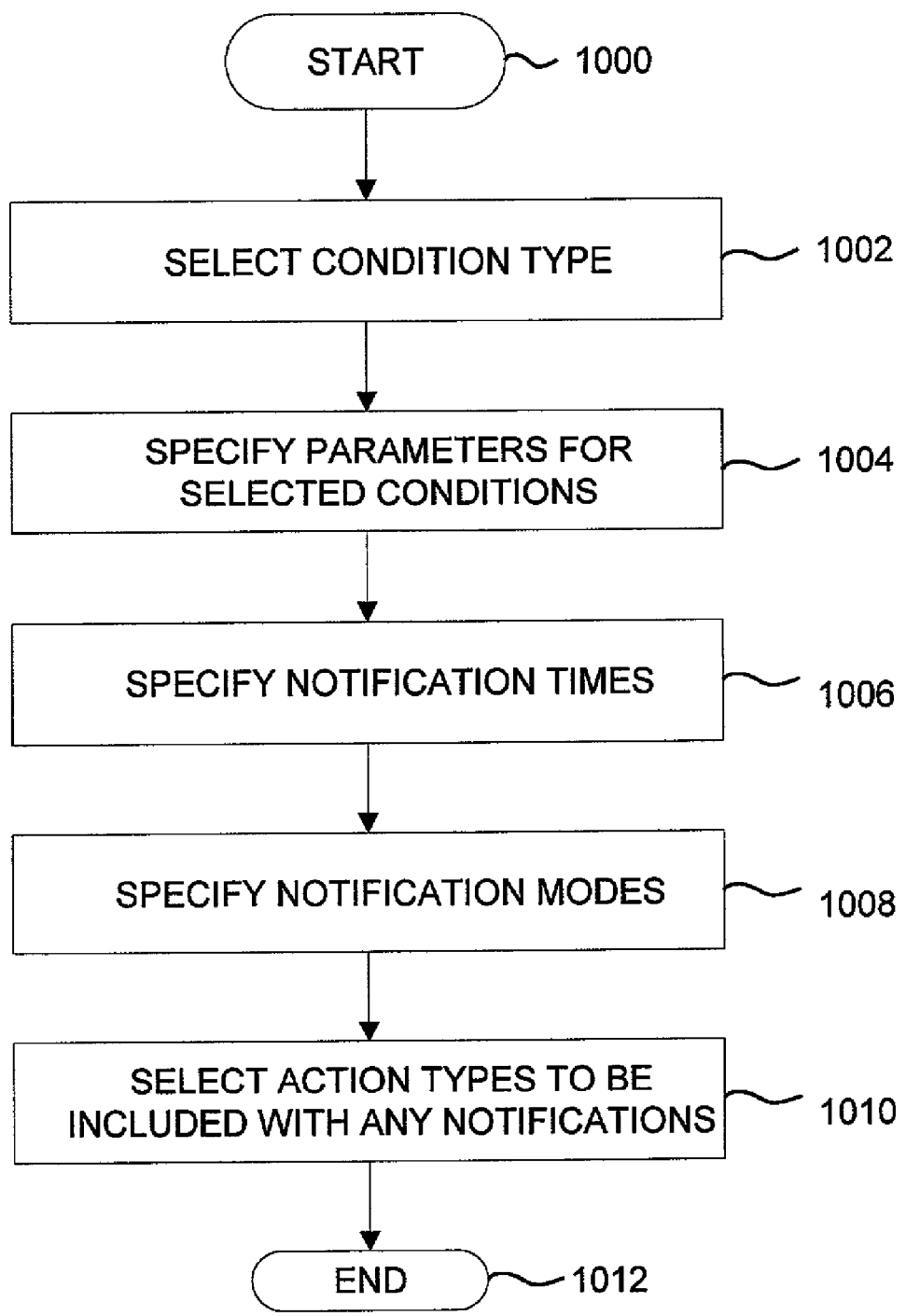
FIGS. 10–24 are flow diagrams illustrating operation of a system in accordance with the present embodiments.

FIG. 10 is a flow diagram illustrating one embodiment of a method for creating a new Auto Notification function. In accordance with the present embodiment, each advertiser can create a new Auto Notification function by specifying: 1) the condition type and the parameters for the condition type, 2) the notification time, 3) the notification mode, and 4) the notification action type.

Auto Notification functions are preferably implemented as one or more software agents implemented on a computer system such as the account management web server 22 of FIG. 1. When an Auto Notification function is created, the software routine is created by supervisory software operating on the system using information provided by an advertiser associated with the Auto Notification function and possibly standard or default information. In alternative embodiments, the Auto Notification function may be implemented incorporating dedicated hardware or software components or some combination of these. The system keeps track of all Auto Notification functions, and if any of the conditions tracked by the function becomes true, the system under control of the Auto Notification function records the details. The advertiser is notified immediately if the notification time is immediate. Otherwise all conditions are recorded and are later sent to the advertiser at the specified notification time. The notification is sent in the mode or modes specified by the advertiser, and each notification may include one or more action types to correct any of the undesirable conditions. Further, an advertiser may instruct the system to automatically correct any undesirable conditions.

The system also monitors all incoming corrective actions for previously sent notifications. If a corrective action is received, the system acts upon it to correct the condition of the notification, e.g., increasing the CPC of an advertiser's listing in order to restore it to the desirable rank.

The procedure illustrated in FIG. 10 accepts a new Auto Notification function from an advertiser. The procedure begins at block 1000. At block 1002, the condition type for the Auto Notification function is selected. The condition type is specified by the advertiser and is specified for one or more search listings. The search listings are maintained in a search listing database, as described above in conjunction with FIG. 1. The condition type specifies one or more features of the search listing to be monitored by a software agent. At block 1004, the parameters for the conditions selected in block 1002 are specified. At block 1006, notification times are specified for the software agent. The notifications times are associated with the conditions defined in blocks 1002, 1004. In the present embodiment, there are two choices when an advertiser can be notified. First, the advertiser can be notified immediately, or as soon as the specified condition becomes true. Second, the notifications can be aggregated over the specified time interval and, at the end of the interval, the advertiser is notified of all conditions that have become true during the interval. If no conditions have become true during the interval, then in one embodiment, no notification is sent. In other embodiments, a notification specifying no status change is sent.

At block 1008, notification modes for the selected conditions are specified. The modes may be specified by an advertiser or in any other suitable manner. In the present embodiment, there are several possible modes of communication of a notification to an advertiser. First, a notice may be sent to one or more electronic mail addresses specified by the advertiser. Second, a notice may be sent by an instant message account system, again as specified by the advertiser. Third, the notification may be sent by facsimile, faxed to a number prescribed, the advertiser. Fourth, the notice may be sent as a wireless page, as part of a paging system or in conjunction with a radiotelephone or other two-way communication system. Finally, the notification may be sent by telephone, either using an automated system to send and receive information from the advertiser or by means of an operator interacting with the advertiser.

At block 1010, the action types to be included with any notifications are specified by the advertiser. Possible action types include providing an active link embedded in the notification which, when clicked, allows the advertiser to correct the undesirable condition in a single click. In a second action type, the notification may be sent with inactive links, which are pointers to all locations where an advertiser can go to correct any undesirable conditions. A third action type is an electronic mail template which can be filled out by an advertiser who specifies what corrective actions are to be taken and returns the electronic mail to a specified address. Lastly, in the present embodiment, an action type may include provision of a telephone number which the advertiser can call to take corrective action. The process of initiating a new Auto Notification function ends at block 1012.

The method of FIG. 10 may be embodied in accordance with the pseudocode below.

Procedure New-Auto-Notification( )
Select condition type;
Specify parameters for selected condition;
Specify notification times;
Specify notification modes;
Select action types to be included with any notifications;
End Procedure;

As described earlier, in the illustrated embodiment, there are nine types of conditions that an advertiser can select from:
1. position: related to the position of a listing
2. cost: related to the accumulated costs for some listings
3. account-balance: related to the funds remaining in the advertiser's account.
4. impressions: the number of impressions of some listings
5. clicks: the number of clicks of some listings
6. CTR: the click through rate of some listings
7. CPC-too-high: if the CPC of a listing can be reduced without impacting its rank
8. Average CPC too high: the average CPC, the total cost divided by the total clicks, is higher than some threshold.
9. rank-CPC: related to the CPC for a given rank and term Other conditions may be specified as well.

Each condition has a set of parameters for it. After an advertiser selects a condition type, he must specify the parameters for it. The parameters for each of the eight condition types were defined earlier. It is possible for the operator of the marketplace or pay for performance system to provide default values for some of the parameters, depending on the context in which the advertiser is interacting with the system.

The advertiser must also select the notification time(s). This can be "immediate" or "interval." Immediate notifications are sent to the advertiser as soon as the system detects that they are true. Interval notifications, on the other hand, are only sent periodically. The advertiser must specify the interval, e.g., daily. Every time a condition is detected to be true by the system, a log of the details is recorded. At the boundary of every interval the system gathers up all instances of the conditions that are or were true, and includes the details of these in the body of the notification. For example, for a daily interval, once a day the system will send a report of all the conditions that were true in the past 24 hours. The marketplace operator can define the boundaries of the interval (e.g., midnight for daily intervals).

The advertiser must also select one or more notification modes. Notifications can be sent to the advertiser in all the selected notification modes. In one embodiment, there are five notification modes:
1. email: the advertiser must specify one or more e-mail address, which can have a default value.
2. instant messaging: the advertiser must specify the instant-message address, which can have a default value.
3. fax: the advertiser must specify the fax number, which can have a default value.
4. page: the advertiser must specify the page number, which can have a default value.
5. phone: the advertiser must specify the phone number, which can have a default value.

Other notification modes may be specified as well.

Finally, the advertiser may choose to select one or more notification action types for each notification mode selected earlier. Each notification mode has one or more action types that are applicable for use with it. The marketplace operator may automatically provide defaults for the applicable action types for each notification mode. In the illustrated embodiment, there are four notification action types:
1. active links: these can be included in e-mail notifications and instant messaging notifications.
2. inactive links: these can be included in all notification modes.
3. e-mail: these can be included in all notification modes.
4. phone: these can be included in all notification modes.

Other notification action types may be specified as well.

Thus, FIG. 10 shows one method for initializing a new Auto Notification function. The advertiser can also cancel an existing Auto Notification function at any time.

Figure 11:
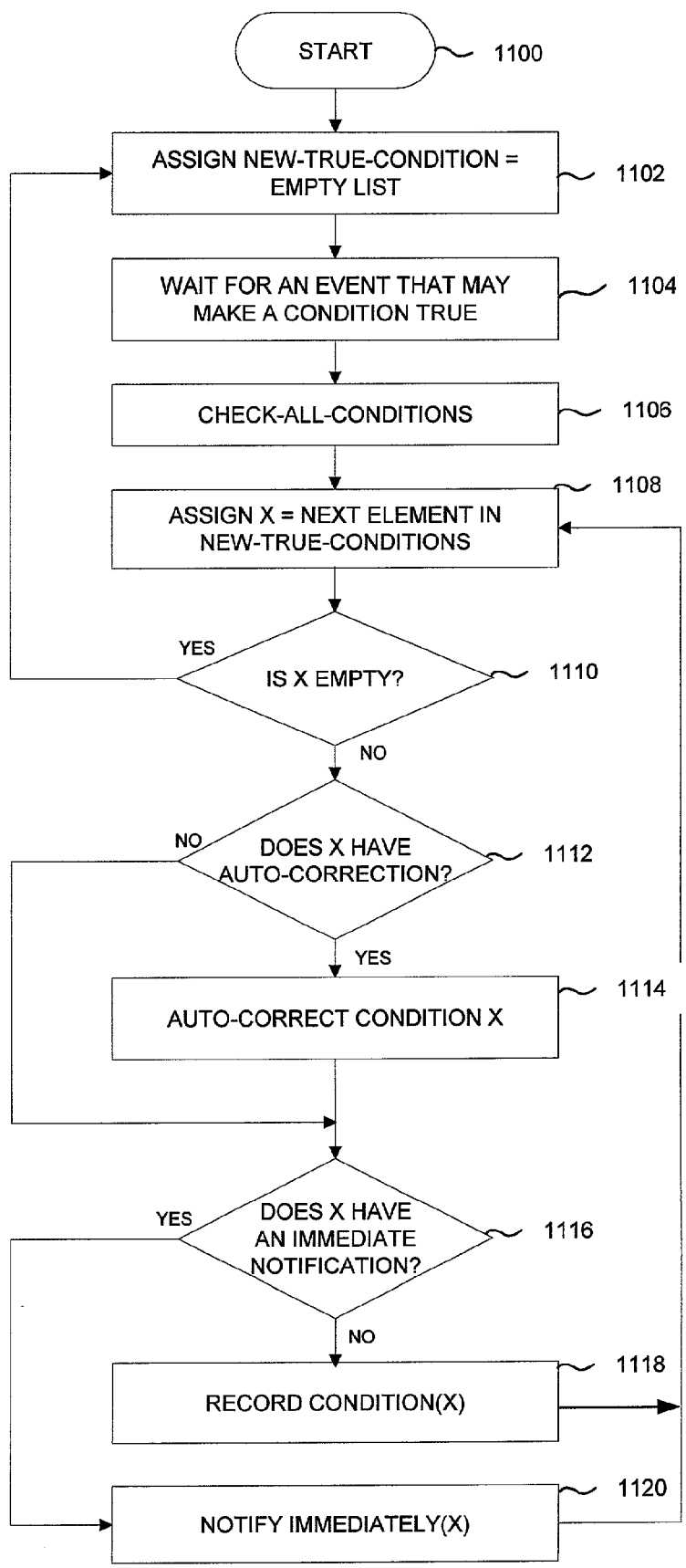

FIG. 11 is a full diagram illustrating operation of a software agent to provide an Auto Notification function, monitoring conditions specified by an advertiser in accordance with the process of FIG. 10. The method of FIG. 11 begins at block 1100.

At block 1102, a variable new-true-condition is initialized to be an empty list. At block 1104, the software agent waits for an event that may make a condition true. Such events include a change in ranking due to bid changes submitted by advertisers and clickthroughs by searchers which may change a monitored clickthrough condition or the clickthrough rate, etc. At block 1106, a process called check-all-conditions is initialized. This process will be described further below in conjunction with FIG. 12.

At block 1108, a variable X is set equal to the next element in the list new-true-conditions. At block 1110, a test is performed to determine if the variable X is empty or stores no data. If X is empty, there are no more elements of the list new-true-conditions to be processed and control returns to block 1102. If X is not empty, control proceeds to block 1112.

At block 1112, it is determined if X has an auto-correction defined for it by the advertiser. If so, control proceeds to block 1114, where the automatic corrective action specified by the advertiser is performed by the system. The corrective action can be any action specified by the advertiser. If, at block 1112, the condition associated with the variable X does not have an auto-correction, control proceeds to block 1116.

At block 1116, it is determined if X has an immediate notification. If so, control proceeds to block 1120, a procedure notify-immediately is initiated to send a notification of the condition to the advertiser. One embodiment of this procedure will be described further below in connection with FIG. 21. If, at block 1116, the condition associated with variable X does not have an immediate notification, at block 1118, the condition associated with variable X is recorded and control returns to block 1108.

In the procedure monitor-conditions illustrated in FIG. 11, the system continually monitors its state to see if any conditions have become true. Only the transition from a condition being false to a condition being true is relevant. For example, a condition event is recorded when an advertisers account balance falls below the set threshold. If the balance further decreases, this is not recorded as a separate instance of the condition being true.

The method of FIG. 11 may be embodied in accordance with the pseudocode below.

---

Procedure monitor-conditions ( )

Loop
   Assign new-true-conditions = empty list;
   Wait for an event that may make a condition true;
   Check-all-conditions;
   Loop x over new-true-conditions
     If x has an immediate notification time
       Notify-immediately (x);
     Else
       Record condition x;
     End If;
   End Loop;
End Loop;
End Procedure;

---

Figure 12:
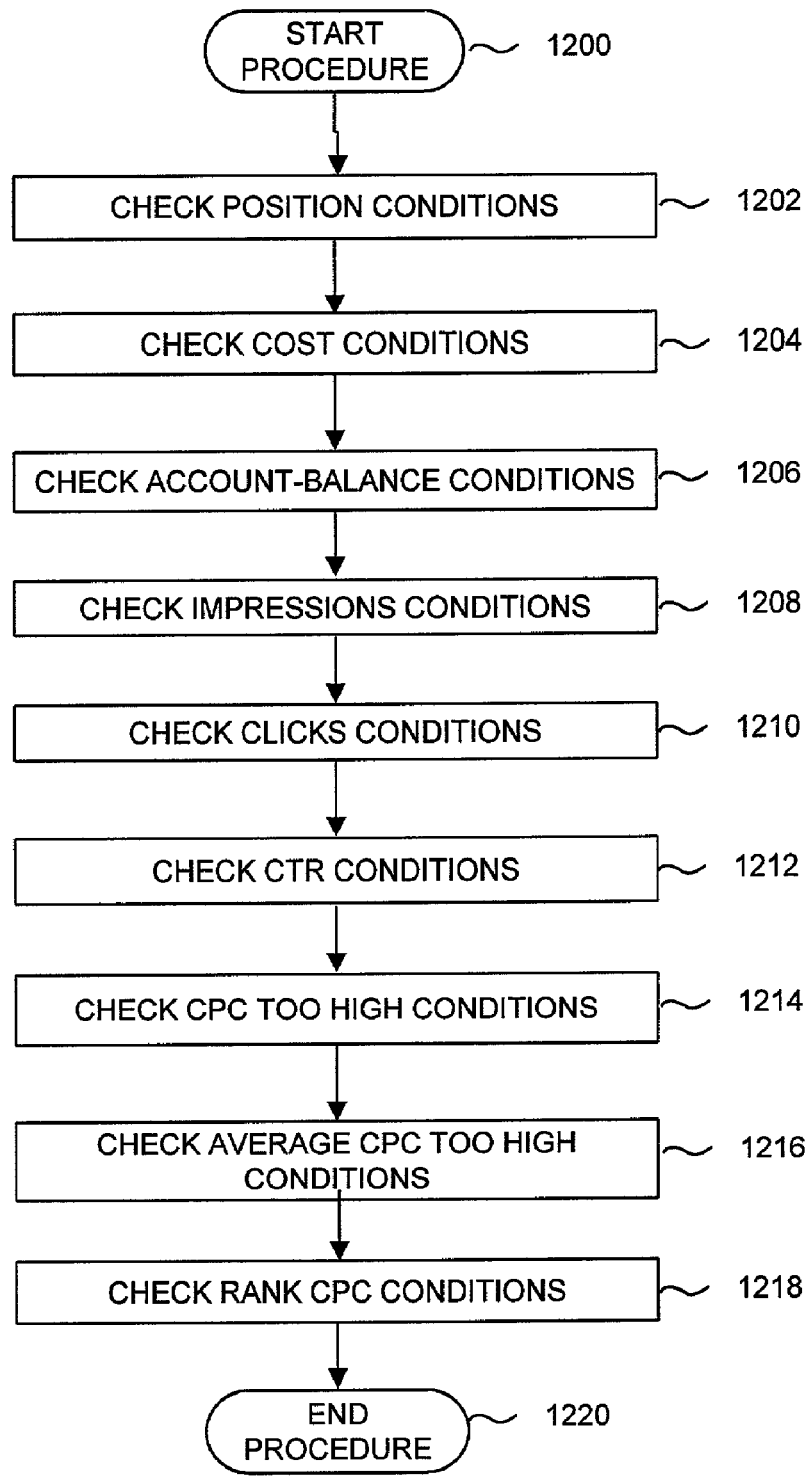

Checking if any conditions have become true involves checking the eight different condition types: FIG. 12 illustrates one embodiment of the procedure check-all-conditions, implemented at block 1106 of FIG. 11. Checking if any conditions have become true involves checking 8 different condition types. This is illustrated in FIG. 12. The method begins at block 1200.

At block 1202, all position conditions are checked. At block 1204 all cost conditions are checked. At block 1206 all account balance conditions are checked. At block 1208 all impressions conditions are checked. At block 1210, all clicks conditions are checked. At block 1212 all clickthrough rate (CTR) conditions are checked. At block 1214 all CPC-too-high conditions are checked. At block 1216, all average CPC-too-high conditions are checked. At block 1218, all rank CPC conditions are checked. The method ends at block 1220. In alternative embodiments, only one or more subsets of these conditions may be checked at any given time. Alternatively, if not all condition types are supported in an embodiment, some checks may be omitted. Particular embodiments of the methods for checking the conditions specified in FIG. 12 are illustrated in greater detail in FIG. 13–21.

The method of FIG. 12 may be embodied in accordance with the pseudocode below.

Figure 13:
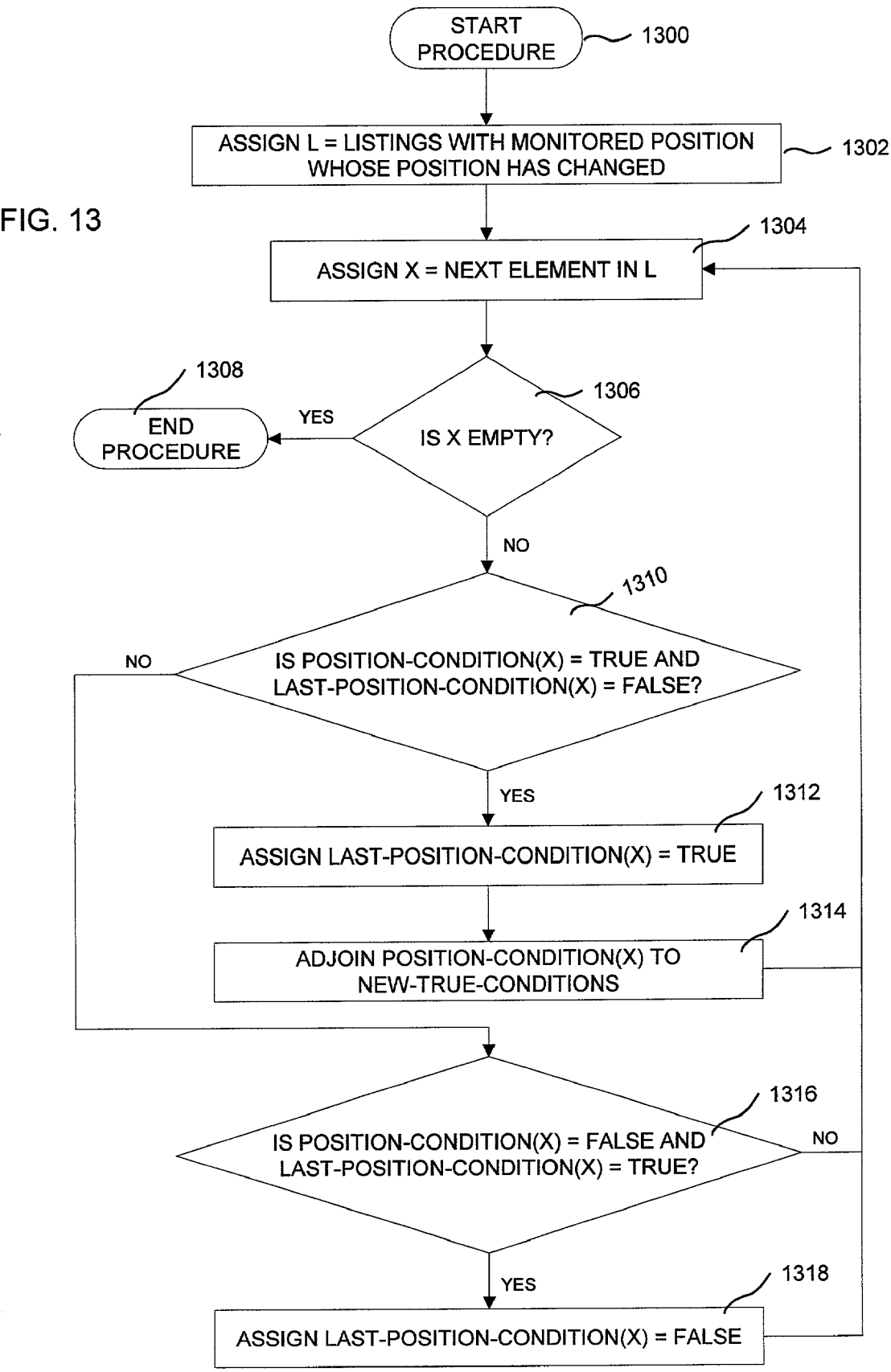

Procedure Check-all-conditions( )
Check-position-conditions;
Check-cost-conditions;
Check-account-balance-conditions;
Check-impressions-conditions;
Check-clicks-conditions;
Check-CTR-conditions;
Check-CPC-too-high-conditions;
Check-average-CPC-too-high-conditions;
Check-rank-CPC-conditions;
End Procedure;

FIG. 13 is a flow diagram illustrating a procedure to check if any "position" conditions have become true. The method begins at block 1300.

At block 1302, variable L is set equal to search listings with monitor positions whose position has changed. The identity of these search listings may be determined in any suitable manner. At block 1304, the variable X is incremented to be the next element in the list L. At block 1306, a test is performed to determine if variable X is empty. If so, the end of the list contained in variable L has been reached and the procedure ends at block 1308. If not, at block 1310, it is determined if the position condition associated with the listing in variable X is currently true and if the last position condition associated with this variable is false. This is determined by comparing the current position condition associated with the search listing indicated by the variable X with a stored last position condition for this variable. If the test of block 1310 produces a true or yes response, at block 1312, the variable last position condition for the search listing X is reset equal to a true value and, in block 1314, the position condition for the variable X is adjoined to the list of new-true-conditions. Control then returns to block 1304 to select the next element in the list L.

If, at block 1310, the test produced a negative or false response, at block 1316 another test is performed to determine if the position condition for variable X is false and the last position condition for variable X is true. If not, control returns to block 1304. If so, at block 1318, the last position condition for the search listing associated with the variable X is set equal to a false value. Control then returns to block 1304.

The method of FIG. 13 may be embodied in accordance with the pseudocode below.

```
Procedure Check-position-conditions ( )

Assign L = listings with monitored position whose position has
changed;
    Loop x over all elements in L
        If position-condition(x) = true and
            last-position-condition(x) = false
            Assign last-position-condition(x) = true;
            Adjoin position-condition(x) to new-true-conditions;
        Else If position-condition(x) = false and
            last-position-condition(x) = true
            Assign last-position-condition(x) = false;
        End If;
    End Loop;
End Procedure;
```

Whenever a position condition is first created, its "last-position-condition" is automatically initialized to be false, and its position is treated as if it has changed-this permits the condition to be tested immediately.

Figure 14:
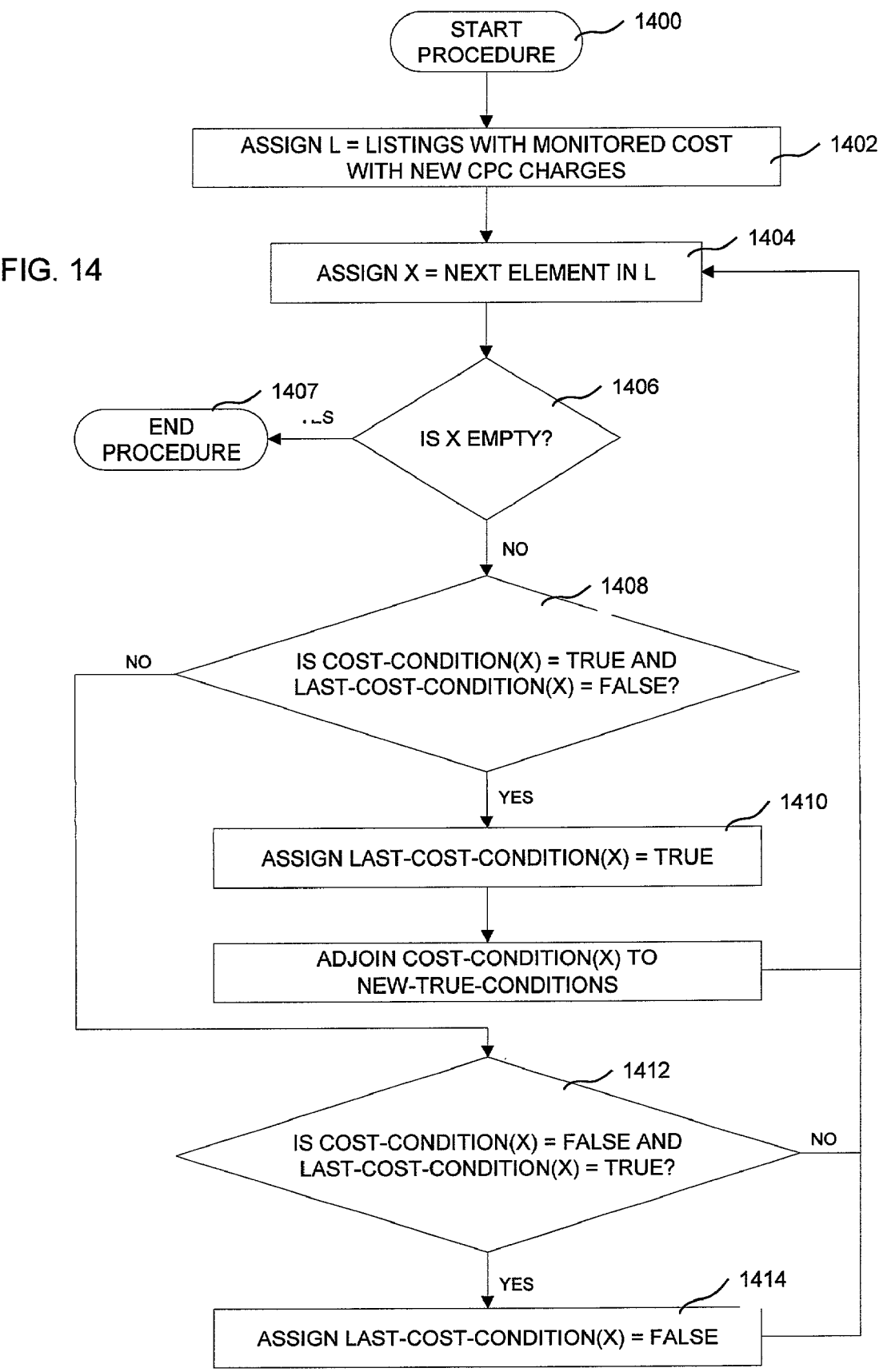

FIG. 14 illustrates one method for checking cost conditions. The procedure begins at block 1400. At block 1402, a variable L is initialized with all search listings with monitored cost and new cost for (CPC) charges. At block 1404, a variable X is assigned equal to the next element in the list L. At block 1406, it is determined if the variable X is empty. If so, the procedure ends at block 1407.

Otherwise, at block 1408, it is determined if the cost-condition for the search listing associated with the variable X is true and the last-cost-condition for the search listing associated with the variable X was false. If so, at block 1410, the last-cost-condition for the search listing is set equal to true. At block 1412, the cost-condition for the search listing associated with the variable X is adjoined to a list of new-true-conditions. Control returns to block 1404.

If, at block 1408, the cost-condition for the search listing had not changed from a previous false to a current true, it is determined if the cost-condition for the search listing associated with the variable X is false and the last cost-condition for the search listing was true. If so, the state of the last-cost-condition for the search listing associated with the variable X is set equal to false at block 1416. Control then returns to block 1404.

The method of FIG. 14 may be embodied in accordance with the pseudocode below.

```
Procedure check-cost-conditions ( )

Assign L = listings with monitored cost with new CPC charges;
Loop x over all elements in L
    If cost-condition(x) = true and
        last-cost-condition(x) = false
        Assign last-cost-condition(x) = true;
        Adjoin cost-condition(x) to new-true-conditions;
    Else If cost-condition(x) = false and
        last-cost-condition(x) = true
        Assign last-cost-condition(x) = false;
    End If;
End Loop;
End Procedure;
```

Whenever a cost condition is first created, its "last-cost-condition" is automatically initialized to be false, and its CPC is treated as if it has changed—this permits the condition to be tested immediately. Note that checking a cost condition requires checking the accumulated costs for all listings in the condition since the last interval. We ignore all costs at time points earlier than the most recent advertiser-defined interval for this condition. For example, if the interval is "daily", then all costs for the previous day are ignored (the marketplace operator can define the boundary for the intervals).

Figure 15:
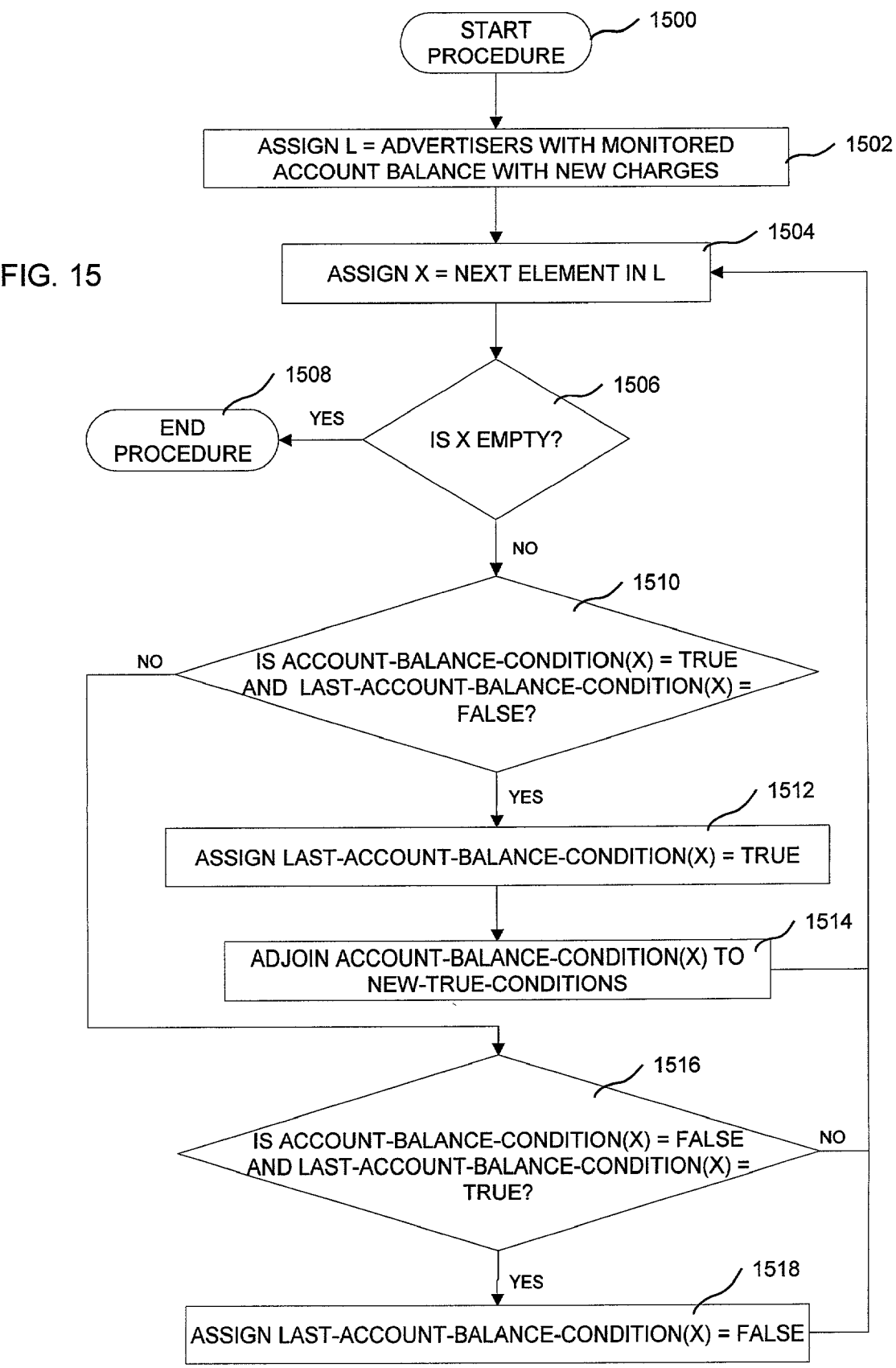

FIG. 15 illustrates one embodiment of a method for checking account balance conditions. The method begins at block 1500. At block 1502, a variable L is assigned to contain a list of advertisers with monitored account balances with new charges. At block 1504, a variable X is increment to contain the next element in the list L. At block 1506, it is determined if variable X is empty. If so, the procedure ends at block 1508.

Otherwise, at block 1510, it is determined if the account-balance-condition for the search listing associated with the variable X is true and if the last-account-balance-condition for the search listing was false. If so, at block 1512, the variable last-account-balance-condition for the search listing is set equal to true. At block 1514, the account-balance-condition for the search listing is adjoined to a list of new-true-conditions. Control then returns to block 1504.

If the result of the test at block 1510 was negative, at block 1516, a test is performed to determine if the account-balance-condition for the search listing associated with the variable X is now false and the last-account-balance-condition for the search listing was true. If so, at block 1518, a variable last-account-balance-condition for the search listing associated with the variable X is set equal to false. Control returns to block 1504 to select the next element in the list L.

The method of FIG. 15 may be embodied in accordance with the pseudocode below.

```
Procedure check-account-balance-conditions ( )

Assign L = advertisers with monitored account balance w new charges;
Loop x over all elements in L
    If account-balance-condition(x) = true and
        last-account-balance-condition(x) = false
        Assign last-account-balance-condition(x) = true;
        Adjoin account-balance-condition(x) to new-true-conditions;
    Else If account-balance-condition(x) = false and
        last-account-balance-condition(x) = true
        Assign last-account-balance-condition(x) = false;
    End If;
End Loop;
End Procedure;
```

In the illustrated embodiment, whenever an account balance condition is first created, its "last-account-balance-condition" is automatically initialized to be false, and it is treated as if it has new charges-this permits the condition to be tested immediately.

Figure 16:
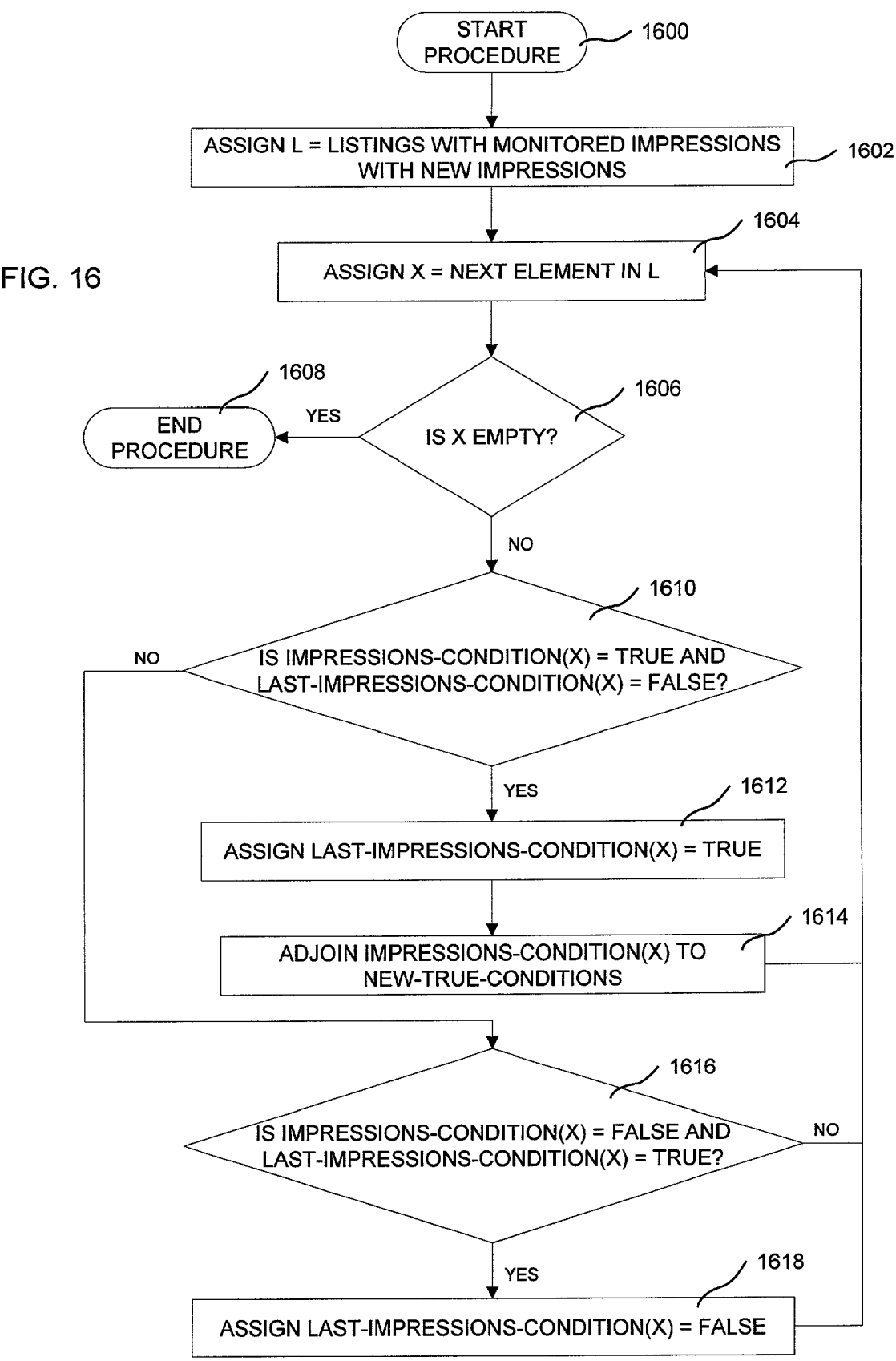

FIG. 16 illustrates a method for checking impressions conditions. The method begins at block 1600. At block 1602, the list variable L is initialized with all listings with monitored impressions having new impressions. At block 1604, the variable X is incremented to point to the next element in the list L. At block 1606, it is determined if the search listing pointed to by the variable X is empty. If so, the procedure terminates at block 1608. Otherwise, at block 1610, it is determined if the impressions-condition for the search listing designated by variable X is true and if the last-impression-condition for the search listing associated with the variable X was false. If so, at block 1612, the variable-last-impressions-condition for the search listing is set equal to true. At block 1614, the value of the variable-impressionscondition for the search listing is adjoined to the list new-true-conditions. Control returns to block 1604 to select a next element in the list L.

If, at block 1610, the test return a negative result, at block 1616 it is determined if the variable impressions-condition for the search listing associated with the variable X has a false value and if the variable-last-impressions-condition for the search listing has a true value. If so, then at block 1618, the variable-last-impressions-condition for the search listing is assigned a value of false and control returns to block 1604.

The method of FIG. 16 may be embodied in accordance with the pseudocode below.

```
Procedure check-impressions-conditions ( )

Assign L = listings with monitored impressions with new impressions;
Loop x over all elements in L
    If impressions-condition(x) = true and
       last-impressions-condition(x) = false
        Assign last-impressions-condition(x) = true;
        Adjoin impressions-condition(x) to new-true-conditions;
    Else If impressions-condition(x) = false and
       last-impressions-condition(x) = true
        Assign last-impressions-condition(x) = false;
    End If;
End Loop;
End Procedure;
```

Whenever an impressions condition is first created, its value of last-impressions-condition is automatically initialized to be false, and it is treated as if it has a new impression. This permits the condition to be tested immediately. Note that checking an impressions condition requires checking the accumulated impressions of all the listings in the condition. We ignore all impressions that are earlier than the most recent advertiser-defined interval for this condition. For example, if the interval is "daily", then all impressions for the previous day are ignored (the marketplace operator can define the boundary for the intervals).

Figure 17:
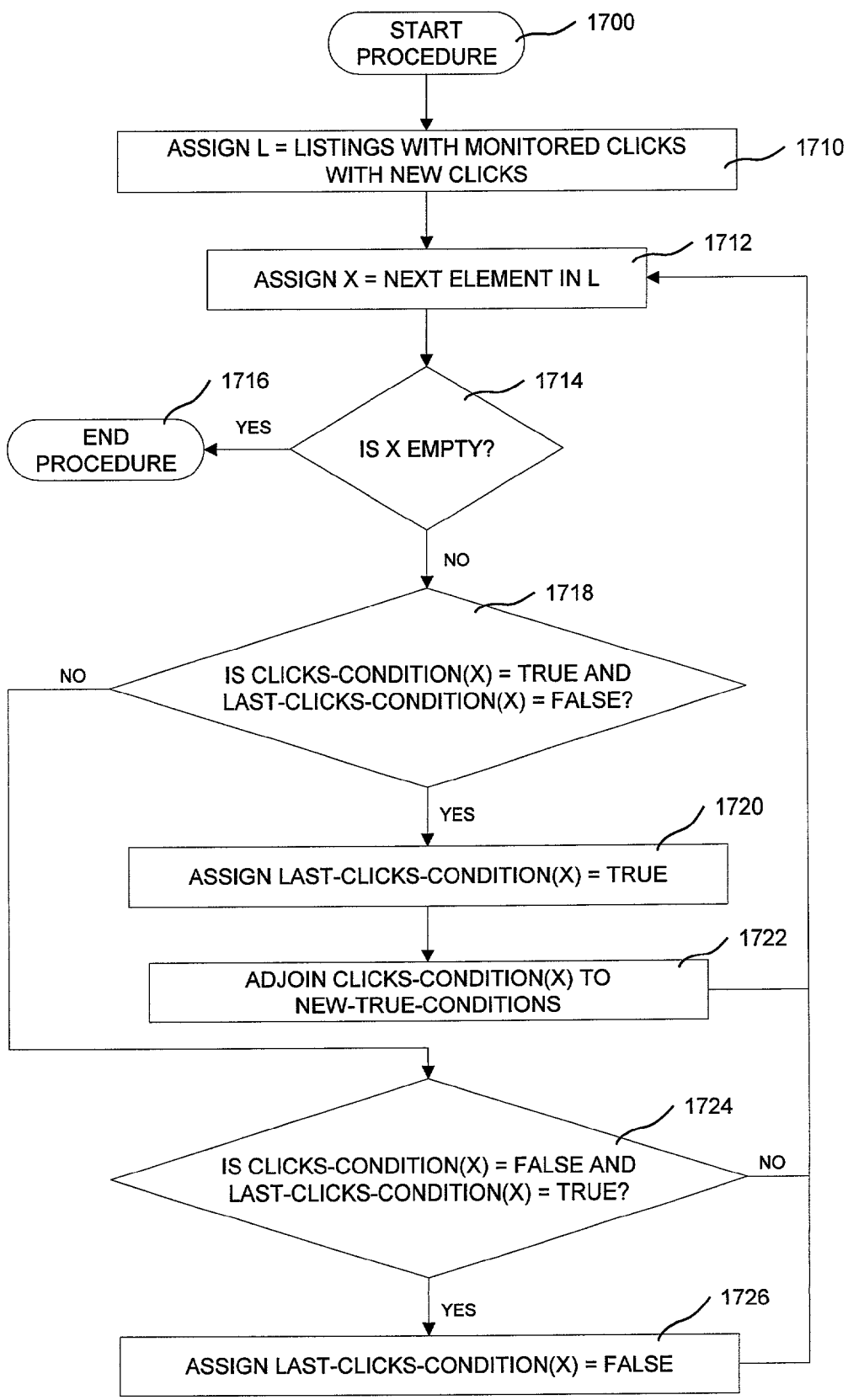

FIG. 17 illustrates one embodiment of a method for checking clicks conditions. The method begins at block 1700. At block 1710, a list variable L is filled with listings with monitored clicks having new clicks. At block 1712, a variable X is initialized or incremented to contain the next element in the list variable L. At block 1714, it is determined if the variable X is empty. If so, at block 1716, the procedure ends. If not, at block 1718, it is determined if the clicks-condition for the search listing associated with the variable X has a value true and the variable last-clicks-condition for the search listing associated with the variable X had a value false. If so, at block 1720, the variable last-clicks-condition for the search listing is set equal to a value true. At block 1722, the contents of the variable clicks-condition for the search listing are adjoined to the list of new-true-conditions. Control returns to block 1712.

If the test at block 1718 had a negative result, at block 1724, it is determined if the clicks-condition for the search listing has a variable false and if the variable last-clicks-condition for the search listing had a variable true. If so, at block 1726 the variable last-clicks-condition for the search listing is set equal to a value false. Control then returns to block 1712.

The method of FIG. 17 may be embodied in accordance with the pseudocode below.

```
Procedure check-clicks-conditions ( )

Assign L = listings with monitored clicks with new clicks;
Loop x over all elements in L
    If clicks-condition(x) = true and
       last-clicks-condition(x) = false
        Assign last-clicks-condition(x) = true;
        Adjoin clicks-condition(x) to new-true-conditions;
    Else If clicks-condition(x) = false and
       last-clicks-condition(x) = true
        Assign last-clicks-condition(x) = false;
    End If;
End Loop;
End Procedure;
```

Whenever a clicks condition is first created, its value of last-clicks-condition is automatically initialized to be false. It is treated as if it has a new click. This permits the condition to be tested immediately. Note that checking a clicks condition requires checking the accumulated clicks of all the listings in the condition. We ignore all clicks that are earlier than the most recent advertiser-defined interval for this condition. For example, if the interval is "daily", then all clicks for the previous day are ignored.

Figure 18:
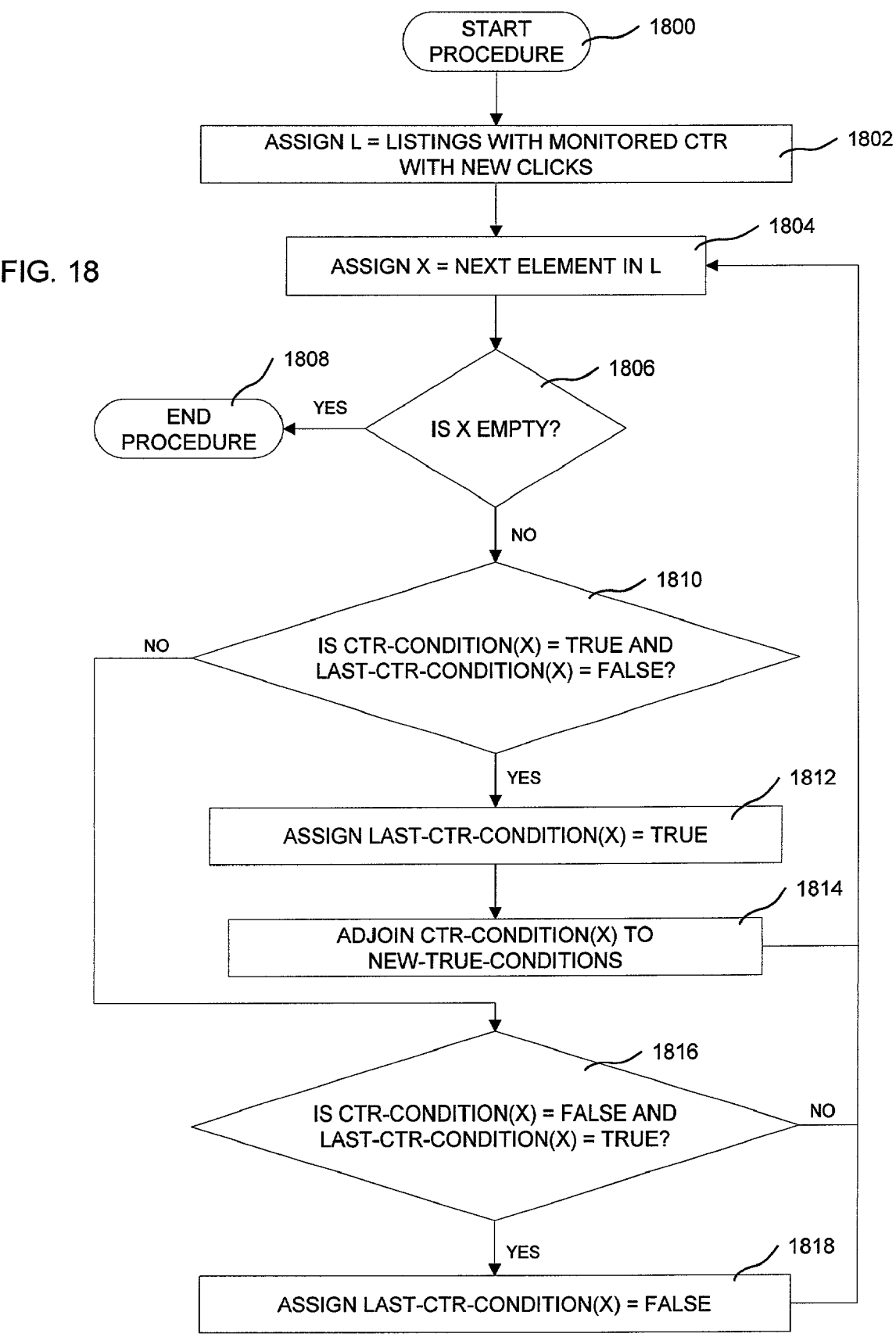

FIG. 18 is a flow diagram illustrating a method for checking clickthrough rate (CTR) conditions. Clickthrough rate is the number of clickthroughs for a search listing in a specified time period divided by the specified time period, such as clicks per hour or clicks per day. The method begins at block 1800.

At block 1802, a list variable L is initialized with all search listings having monitored clickthrough rate and with new clicks. At block 1804, a variable X is initialized to point to the next element in the list variable L. At block 1806, it is determined if the variable X is empty. If so, at block 1808 the method ends. If not, at block 1810, it is determined if the variable CTR-condition for the search listing designated by the variable X is true and if the last-CTR-condition for the search listing had a value false. If so, at block 1812, the variable last-CTR-condition for the search listing is set equal to a value true. At block 1814, the contents of the variable CTR-condition for the search listing is adjoined to the list of new-true-conditions and control returns to block 1804.

If, at block 1810, the test produced a negative result, at block 1816 it is determined if the variable CTR-condition for the search listing associated with the variable X has a value false and if the variable last-CTR-condition for the search listing had a value true. If so, at block 1818, the variable last-CTR-condition for the search listing is assigned a value false and control then returns to block 1804.

The method of FIG. 18 may be embodied in accordance with the pseudocode below.

```
Procedure check-CTR-conditions ( )

Assign L = listings with monitored CTR with new clicks;
Loop x over all elements in L
    If CTR-condition(x) = true and
       last-CTR-condition(x) = false
        Assign last-CTR-condition(x) = true;
        Adjoin CTR-condition(x) to new-true-conditions;
    Else If CTR-condition(x) = false and
       last-CTR-condition(x) = true
        Assign last-CTR-condition(x) = false;
    End If;
End Loop;
End Procedure;
```

Whenever a CTR condition is first created, its value of last-CTR-condition is automatically initialized to be false. It is treated as if it has a new click. This permits the condition to be tested immediately. Note that checking a CTR condition requires checking the accumulated impressions and clicks for all the listings in the condition. We ignore all impressions and clicks that are earlier than the most recent advertiser-defined interval for this condition. For example, if the interval is "daily", then all impressions and clicks for the previous day are ignored. The marketplace operator may require a minimum number of impressions before considering the CTR to be valid.

Figure 19:
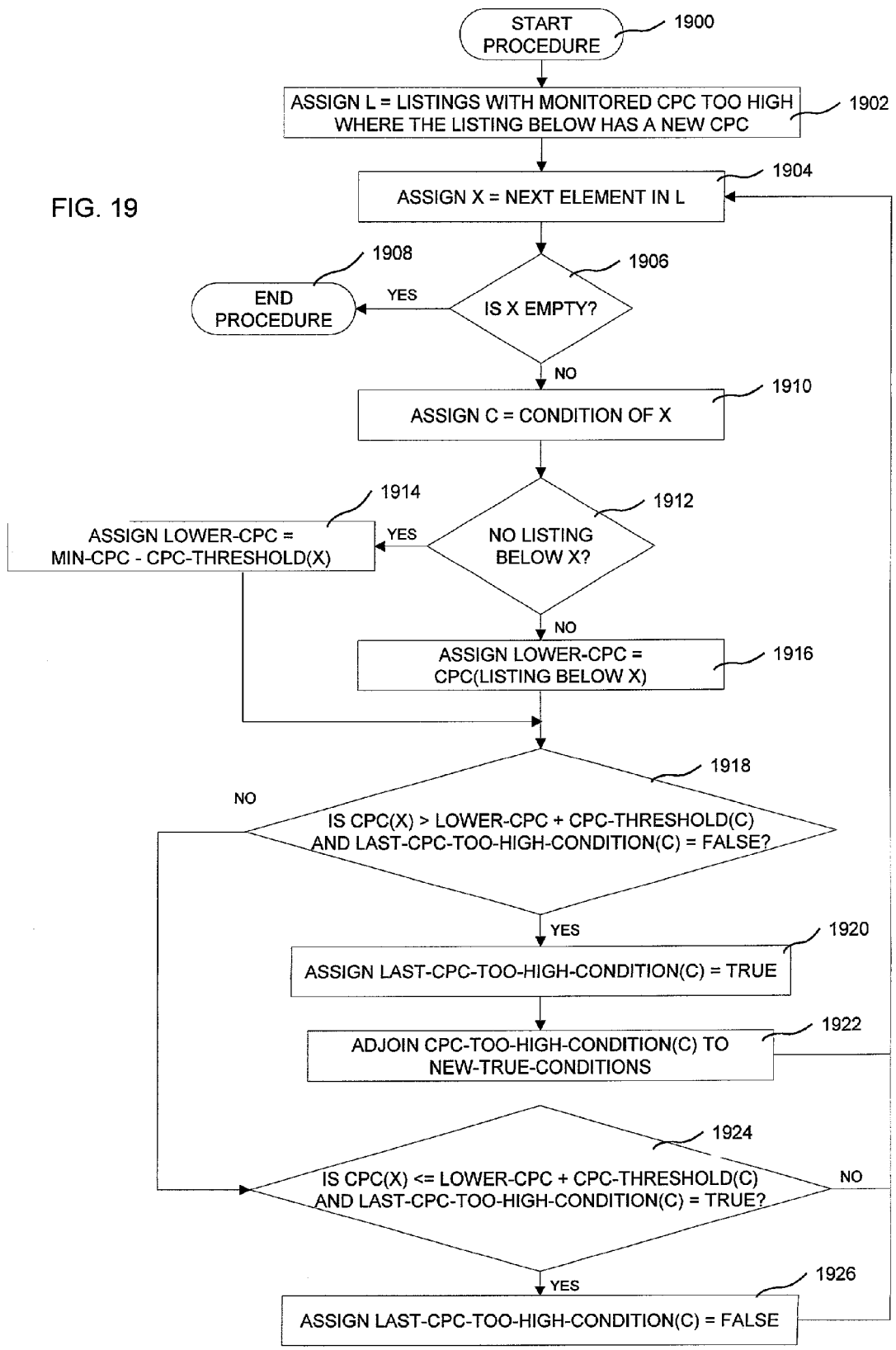

FIG. 19 is a flow diagram illustrating a method for checking CPC-too-high conditions. These are conditions where the cost per click is higher than necessary. The procedure begins at block 1900.

At block 1902, a list variable L is initialized with all search listings having monitored CPC-too-high where the listing below has a new CPC. The listing below has a new CPC if the CPC of the listing below is changed, or if a new listing is inserted below, or if the previous listing below is removed. At block 1904, a variable X is set to point to the next element in the list variable L. At block 1906, it is determined if the variable X is empty, indicating the end of the list L has been reached. If X is empty, at block 1908 the procedure ends. Otherwise, at block 1910, a variable C is set equal to the condition of X. At block 1912, it is determined if there is no listing below X. If not, at block 1916, the variable lower-CPC is set equal to the cost per click for the search listing immediately below the search listing indicated by the variable X. If there is no a search listing below the listing indicated by the variable X, at block 1914, the variable lower-CPC is set equal to the difference between the minimum cost per click for the system and a CPC threshold for the search listing. At block 1918, it is determined if the cost per click for the search listing is greater than the value of lower-CPC plus CPC threshold for the variable C and if the value of the variable last-CPC-too-high-condition for the variable C is false. If so, at block 1920, the variable last-CPC-too-high-condition is set equal to true. At block 1922, the contents of the variable CPC-too-high-condition are adjoined to the list of new-true-condition and control returns to block 1904.

If at block 1918 the test produced a negative result, at block 1924, it is determined if the CPC for the search listing is less than or equal to the lower-CPC plus the CPC-threshold and if the value of the variable last-CPC-too-high-condition is equal to true. If so, at block 1926, the variable last-CPC-too-high-condition is set equal to a value of false. Control then returns to block 1904. The method of FIG. 19 may be embodied in accordance with the pseudocode below.

---
Procedure check-CPC-too-high-conditions( )
---

```
Assign L = listings with CPC-too-high monitor where the listing below
    has a new CPC;
Loop x over all elements in L
    Assign c = condition of x;
    If no listing below x
        Assign lower-CPC = Min-CPC – CPC-threshold(c);
    Else
        Assign lower-CPC = CPC(listing below x);
    End If;
    If CPC(x) > lower-CPC + CPC-threshold(c) and
       Last-CPC-too-high-condition(c) = false
        Assign last-CPC-too-high-condition(c) = true;
        Adjoin CPC-too-high-condition(c) to new-true-conditions;
```

---
-continued

Procedure check-CPC-too-high-conditions( )
---

```
    Else if CPC(x) lower-CPC + CPC-threshold(c) and
       Last-CPC-too-high-condition(c) = true
        Assign last-CPC-too-high-condition(c) = false;
    End If;
End Loop;
End Procedure;
```

Whenever a CPC-too-high condition is first created, its value of last-CPC-too-high-condition is automatically initialized to be false and it is treated as if the listing directly below it has a new CPC. This permits the condition to be tested immediately. Min-CPC is the minimum CPC for all listings, which is determined by the marketplace operator and in one example is $0.01. Every CPC-too-high condition has an advertiser defined threshold. This threshold is the difference between the CPC of the listing and the CPC of the listing below must be greater than this threshold for the condition to be true. If there is no listing below, we check if the CPC of the listing is higher than the minimum CPC, and alternatively we could check if the CPC is the threshold above the minimum CPC.

Figure 20:
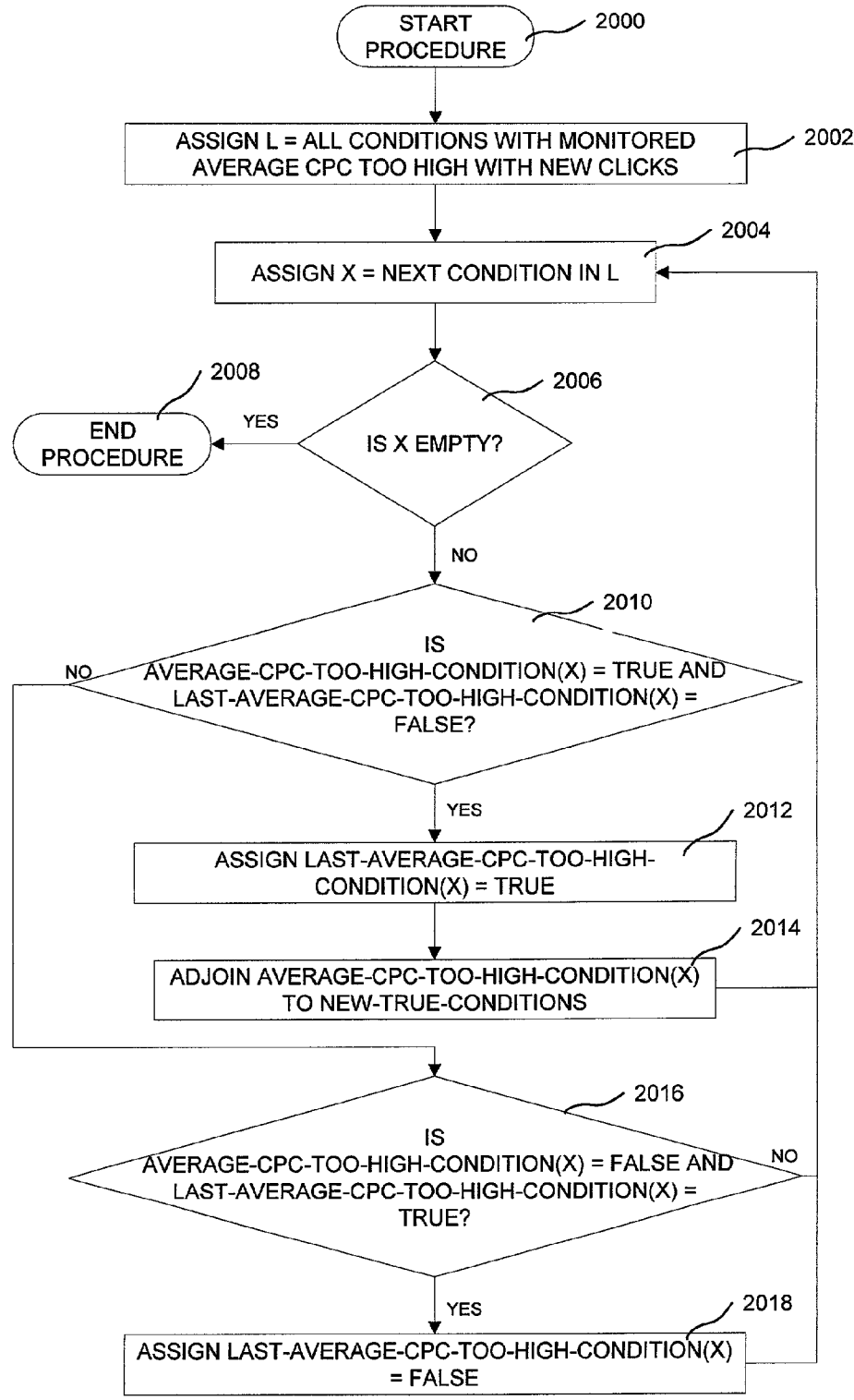

FIG. 20 is a flow diagram illustrating a method for checking average CPC too high conditions. The average CPC for a set of listings is the aggregate cost for the set of listings over an interval divided by the aggregate clicks for the set of listings for the same interval. The method begins at block 2000.

At block 2002, a list variable L is initialized with the list of conditions having monitored average CPC too high and with new clicks. Each such condition has an associated set of listings whose average CPC is being monitored. At block 2004, a variable X is initialized to point to the next element in the list variable L. At block 2006, it is determined if the variable X is empty. If so, at block 2008 the method ends. If not, at block 2010, it is determined if the variable average-CPC-too-high-condition for the condition designated by the variable X is true and if the last-average-CPC-too-high-condition for the condition had a value false. If so, at block 2012, the variable last-average-CPC-too-high-condition for the condition is set equal to a value true. At block 2014, the contents of the variable average-CPC-too-high-condition for the search listing is adjoined to the list of new-true-conditions and control returns to block 2004.

If, at block 2010, the test produced a negative result, at block 2016 it is determined if the variable average-CPC-too-high-condition for the condition associated with the variable X has a value false and if the variable last-average-CPC-too-high-condition for the search listing had a value true. If so, at block 2018, the variable last-average-CPC-too-high-condition for the condition is assigned a value false and control then returns to block 2004.

The method of FIG. 20 may be embodied in accordance with the pseudocode below.

---
Procedure check-average-CPC-too-high-conditions( )
---

```
Assign L = all conditions with monitored CPC too high with new
    clicks;
Loop x over all elements in L
    If average-CPC-too-high-condition(x) = true and
       last-average-CPC-too-high-condition(x) = false
        Assign last-average-CPC-too-high-condition(x) = true;
```

-continued

```
Procedure check-average-CPC-too-high-conditions( )

Adjoin average-CPC-too-high-condition(x) to new-true-
            conditions;
        Else If average-CPC-too-high-condition(x) = false and
            last-average-CPC-too-high-condition(x) = true
            Assign last-average-CPC-too-high-condition(x) = false;
        End If;
    End Loop;
End Procedure;
```

Whenever an average CPC too high condition is first created, its value of last-average-CPC-too-high-condition is automatically initialized to be false. It is treated as if it has a new click. This permits the condition to be tested immediately. Note that checking an average CPC too high condition requires checking the accumulated clicks and costs for all the listings in the condition. We ignore all clicks and costs that are earlier than the most recent advertiser-defined interval for this condition. For example, if the interval is "daily", then all clicks and costs for the previous day are ignored. The marketplace operator may require a minimum number of clicks before considering the average CPC to be valid.

Figure 21:
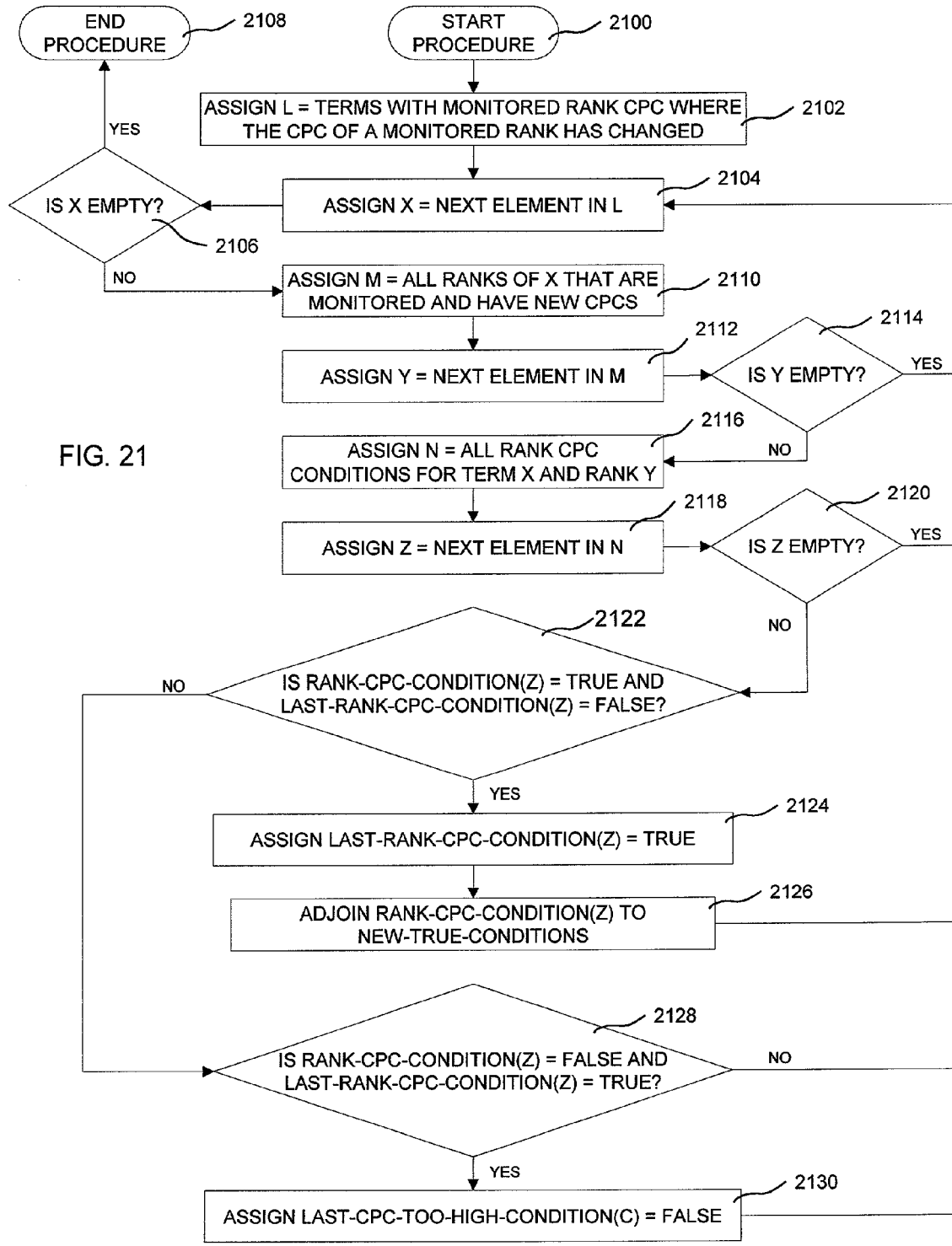

FIG. 21 is a flow diagram illustrating a method for checking rank CPC conditions. The method begin at block 2100. At block 2102, a variable L is assigned equal to all search terms with monitored rank CPC where the cost per click of a monitored rank has changed. At block 2104, a variable X is set to point to the next element in the list L. At block 2106, it is determined if the variable X is empty. If so, this indicates that the end of the list has been reached and the method ends at block 2108.

Otherwise, at block 2110, a variable M is set equal to all ranks of search terms indicated by the variable X that are monitored and have new CPCs. At block 2112 a variable Y is initialized to point to the next element in the list M. At block 2114, it is determined if variable Y is empty. If so, control returns to block 2104 to select the next element in list L. Otherwise, at block 2116, a variable N is set equal to all rank CPC conditions for the search term indicated by the variable X and the rank indicated by the variable Y. At block 2118, variable Z is set equal to the next element in the list N. At block 2120, it is determined if the variable Z is empty. If so, control returns to block 2104. Otherwise, at block 2122 it is determined if the value of the variable rank-CPC-condition for the condition indicated by the variable Z has a value true and if the variable last-rank-CPC-condition for the condition indicated by variable Z had a value false. If so, at block 2124, the variable last-rank-CPC-condition for the condition is set equal to true. At block 2126, the contents of the variable rank-CPC-condition for the condition are adjoined to the list of new-true-conditions. Control then returns to block 2104.

If at block 2122 a negative result was produced, at block 2128 a test determines whether the variable rank-CPC-condition for the condition is false and the variable last-rank-CPC-condition for the condition is true. If so, at block 2130, the variable last-CPC-too-high-condition is set equal to a value false. Control then returns to block 2104.

The method of FIG. 21 may be embodied in accordance with the pseudocode below.

```
Procedure check-rank-CPC-conditions( )

Assign L = terms with a rank-CPC monitor where the CPC of a monitored
    rank has changed;
Loop x over all elements in L
    Loop y over all ranks of x that are monitored and have new CPCs
        Loop z over all rank-CPC conditions for term x and rank y
            If rank-CPC-condition(z) = true and
                Last-rank-CPC-condition(z) = false
                Assign last-rank-CPC-condition(z) = true;
                Adjoin rank-CPC-condition (z) to
                    new-true-conditions;
            Else if rank-CPC-condition(z) = false and
                Last-rank-CPC-condition(z) = true
                Assign last-rank-CPC-condition(z) = false;
            End If;
        End Loop;
    End Loop;
End Loop;
End Procedure;
```

Whenever a rank-CPC condition is first created, its value of last-rank-CPC-condition is automatically initialized to be false and it is treated as if the CPC for the monitored rank has changed. This permits the condition to be tested immediately. Every rank-CPC condition has an advertiser defined threshold. The condition is true if the CPC for the rank is less than or equal to the threshold.

Figure 22:
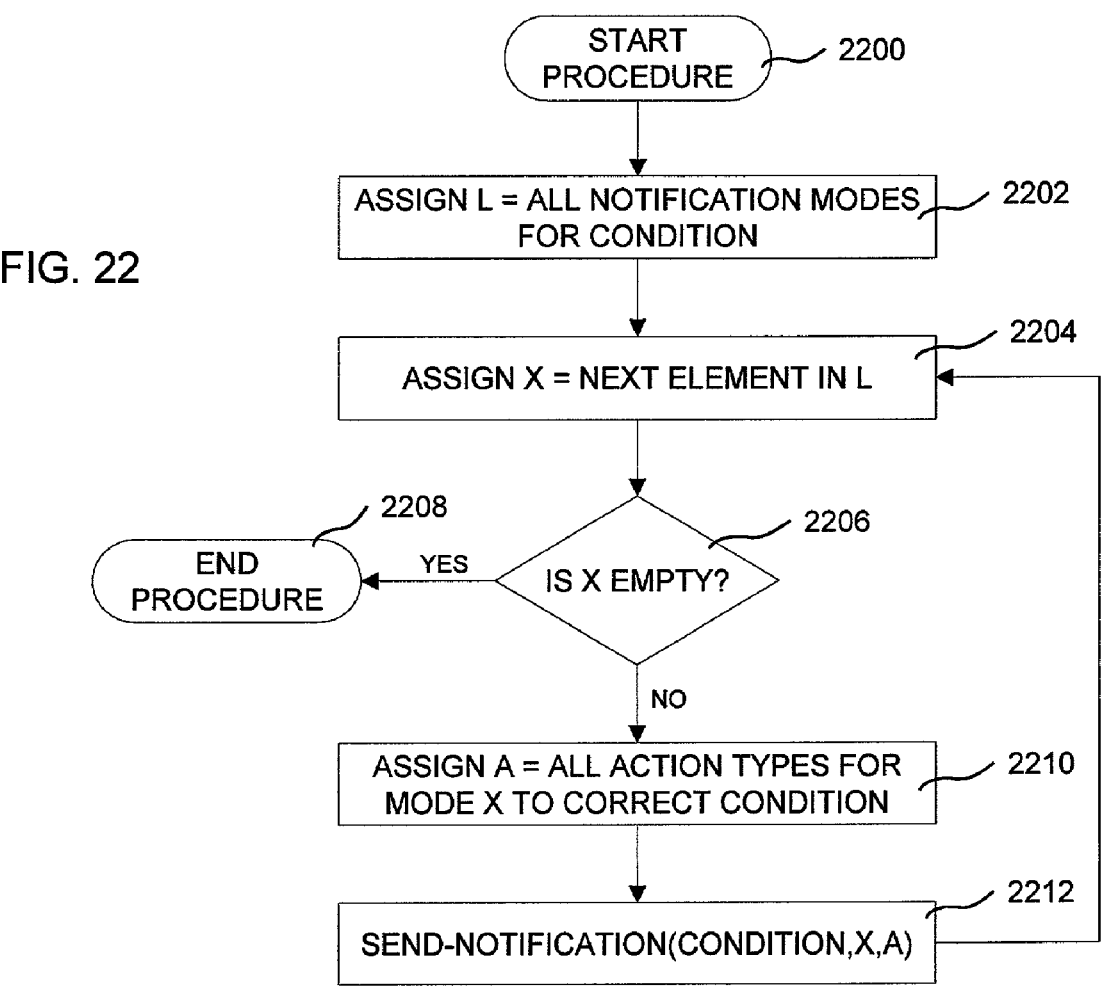

The procedure "notify-immediately" sends a message to the advertiser with the details of the current condition that has become true. The procedure first selects all the notification modes selected by the advertiser. It next selects the action types. The advertiser can select which action type(s) he prefers. Some action types may not be available with all notification modes, e.g., the marketplace operator may only provide "active-links" in e-mails and instant-messages. Also, some conditions may not have any automatic corrective actions (e.g., CTR). The procedure sends a notice to the advertiser in each communication mode, where each message in a particular communication mode possibly includes a set of corrective actions:

FIG. 22 is a flow diagram illustrating one embodiment of the procedure notify-immediately. The procedure starts at block 2200. At block 2202, the variable L is assigned equal to a list of all notification modes for the condition passed to the procedure which has become true. At block 2204, the variable X is initialized to be the next element in the list L. At block 2206, a test is performed to determine if the variable X is empty. If so, at block 2208, the procedure ends, as all elements of the list L have been processed.

If the variable X is not empty, at block 2210, the variable A is set equal to all action types for mode X necessary to correct the condition. At block 2212, a procedure send-notification is called, passing as parameters the condition which is true, the variable X and the variable Y. After processing of this procedure, control returns to block 2204 to select the next element in list L.

The method of FIG. 22 may be embodied in accordance with the pseudocode below.

```
Procedure Notify-immediately(condition)
Loop x over all notification modes for condition
    Assign y = all action types for mode x to correct condition;
    Send-notification (condition,x,y);
End Loop;
End Procedure;
```

The following is a list of the conditions that can have corrective actions included in a notification message. An advertiser can either accept the suggested corrective action in the message, or he can ignore it. The corrective actions are steps that can be taken automatically on behalf of the advertiser to ensure that the condition is no longer true. Note that a corrective action is not applicable if the condition is no longer true:

1. position: it may be possible to correct a position condition by changing the CPC of a listing. For example, if the condition "Listing $L_1$ is not at rank 3" is true, then it may be possible to return $L_1$ to rank 3 by increasing the CPC if $L_1$ is at rank worse than 3, or by decreasing the CPC if $L_1$ is at a rank better than 3.
   A possible corrective action is "Adjust my CPC to return listing $L_1$ to rank 3".
2. account balance: it may be possible to correct an account balance condition by adding more funds to the account. The advertiser may select the additional amount to add.
   A possible corrective action is "Add $200.00 to my account balance from my credit card".
3. CPC too high: it may be possible to correct a CPC too high condition by reducing the CPC to the minimum required to maintain the current rank.
   A possible corrective action is "Reduce the CPC of listing $L_1$ to the minimum required for its current rank".

The procedure notify-interval sends a message to the advertiser with the details of all the condition that have become true in the last interval (the duration of the interval is specified by the advertiser). All the conditions that became true in the interval are gathered together in one message. The procedure selects all the notification modes selected by the advertiser. It next selects the action types. The advertiser can select which action type(s) he prefers. Some action types may not be available with all notification modes, e.g., the marketplace operator may only provide "active-links" in e-mails and instant-messages. Also, some conditions may not have any automatic corrective actions (e.g., CTR).

Figure 23:
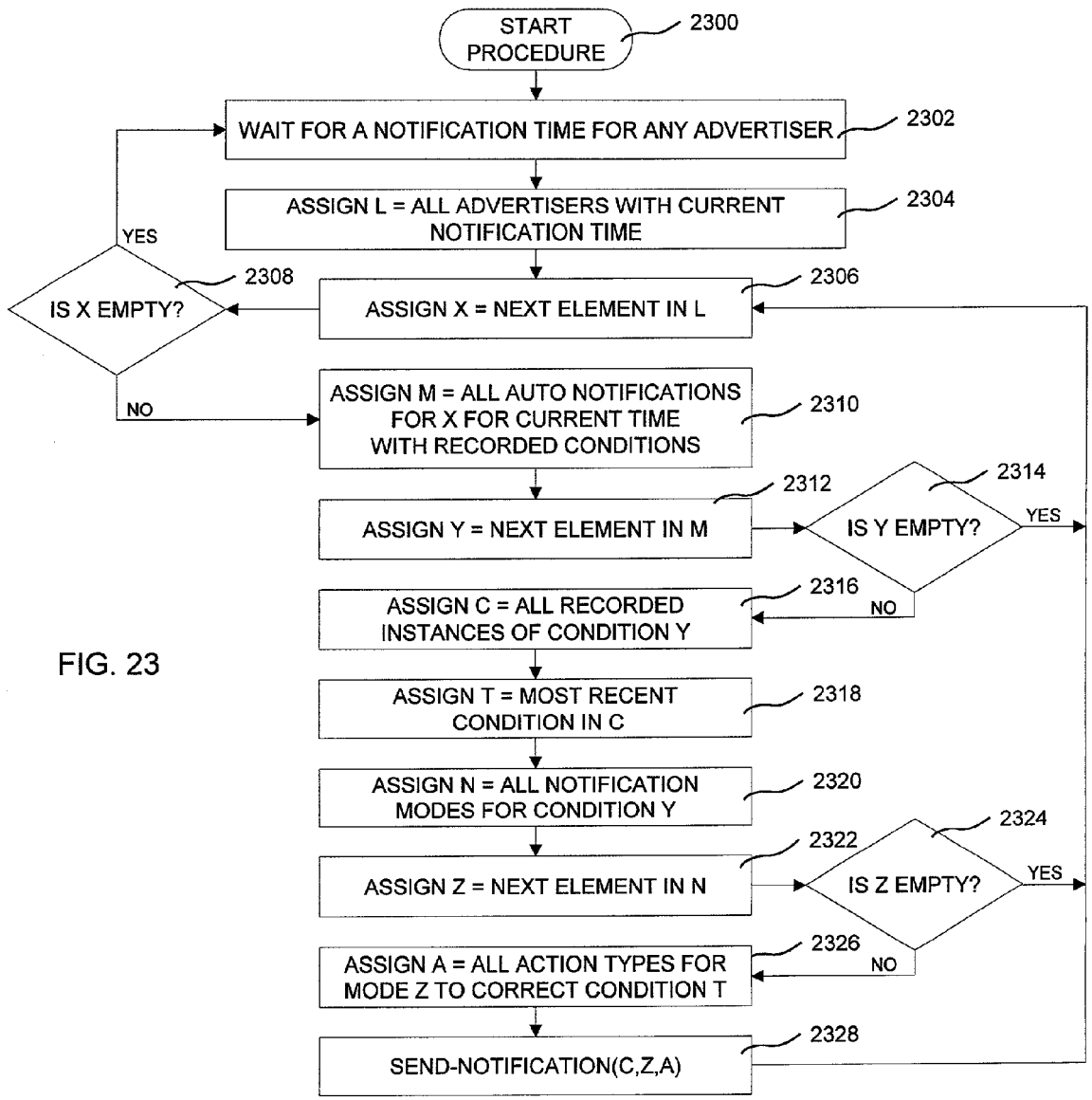

If there is more than one instance of a condition, then it is only possible to have a corrective action for the most recent instance. It is possible that a condition that was recorded earlier is no longer true, in which case it will not have any corrective action associated with it. The procedure sends a notice to the advertiser in each communication mode, where each message in a particular communication mode possibly includes a set of corrective actions:

FIG. 23 is a flow diagram illustrating a procedure notify-interval. The procedure begins at block 2300. At block 2302, the procedure pauses to wait for a notification time for any advertiser. As noted above, information about changed conditions can be communicated by the system to an advertiser according to any schedule specified by the advertiser. The operation at block 2302 is performed according to the advertiser specified schedule.

At block 2304, the list variable L is assigned equal to all advertisers with a current notification time. That is, all advertisers who have specified a notification schedule which matches the current time. At block 2306, the looping variable X is assigned equal to the next element in the list variable L. At block 2308, X is tested to determine if the variable X is empty. If so, control returns to block 2302 to await a next notification time. If the variable X is not empty, control proceeds to block 2310.

At block 2310, the variable M is assigned equal to all auto notification conditions for the advertiser specified by the variable X for the current time which have recorded conditions. At block 2312, a looping variable Y is set equal to the next element in the list M. At block 2314, it is determined if the variable Y is empty. If so, control returns to block 2306 to select the next variable X in the list L. If variable Y is not empty, control proceeds to block 2316.

At block 2316, the variable C is assigned equal to all recorded instances of the condition whose value is stored in variable Y. At block 2318, the variable T is assigned equal to the most recent condition in variable C.

That is, the conditions and their associated time stamps are sorted or otherwise examined to determine a most recently occurring condition. This condition is loaded into the variable T. At block 2320, the variable M is set equal to all notification modes for the condition whose value is stored in variable Y.

At block 2322, the variable Z is incremented to point to the next element in the list N. At block 2324, it is determined if the looping variable Z is empty. If so, control returns to block 2306. Otherwise, at block 2326, the variable A is set equal to all action types for the mode stored in the variable Z, which may be specified by an advertiser to correct the condition specified by the variable T. At block 2328, a procedure send-notification is called, passing as parameters the variables C, Z, and A. Following execution of this procedure, control returns to block 2306 to select the next advertiser selected.

The method of FIG. 23 may be embodied in accordance with the pseudocode below.

```
Procedure Notify-interval()
Loop
Wait for a notification time for any advertiser;
Loop x over all advertisers with current notification time
    Loop y over all auto-notification for x for current
    time with recorded conditions
        Assign c = all recorded instances of condition y;
        Assign t = most recent condition in c;
        Loop z over all notification modes for y
            Assign a = all action types for mode z to
                correct condition t;
            Send-notification (c, z, a);
        End Loop;
    End Loop;
End Loop;
End Loop;
End Procedure;
```

The procedure handle-actions handles incoming actions. A message sent to an advertiser can include an action to correct an undesirable condition. The advertiser can choose to ignore the suggested action, or the advertiser can accept the suggested corrective action, in which case the system must act upon it.

The procedure handle-actions also handles a special advertiser action "tell-me-now." An advertiser can create an auto-notification with a notification time that is an interval. However, at any time the advertiser can send a tell-me-now action, which instructs the system to send all notifications immediately. All notifications for the interval are still sent at the end of the interval, even if the advertiser sends a tell-me-now action. For example, an advertiser may have set up a notification interval "weekly, on Fridays at 3:45 p.m." On Wednesday, the advertiser can send a "tell-me-now" action, which results in the advertiser receiving all the notifications recorded to date. The weekly notifications on Friday at 3:45 p.m. is still sent.

The procedure handle-actions also handles the actions "mute" and "un-mute". The mute action allows the advertiser to stop all notifications—conditions are still recorded, but they are not sent (neither immediately nor at the specified intervals). Instead, the notifications are recorded for future transmission. The un-mute action re-enables the notification of conditions. All past-due notifications are immediately sent (e.g., for immediate notifications and notifications for past intervals). Other notifications will be sent at the end of the interval.

Figure 24:
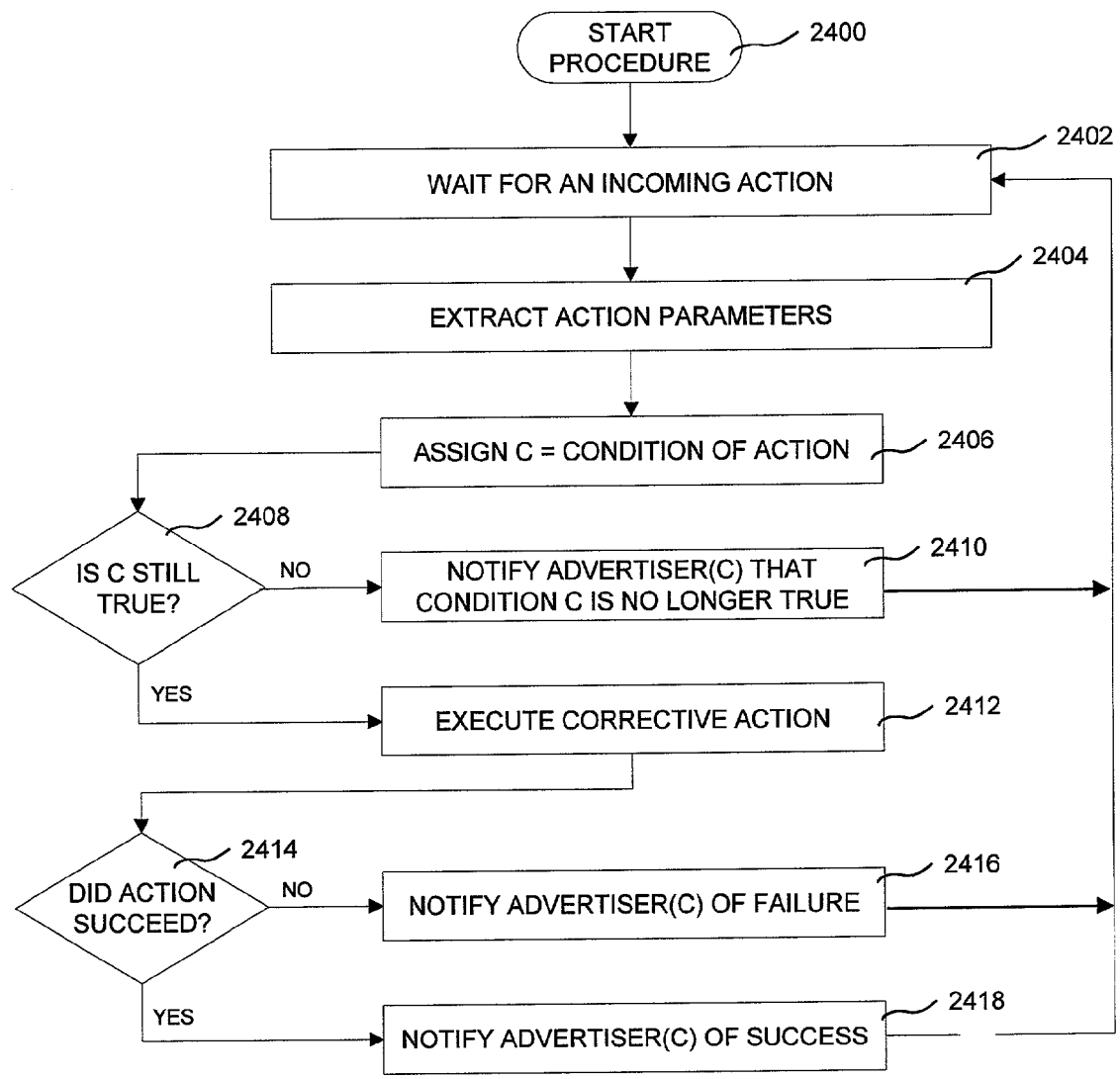

A separate handler is required for each notification action type (active links, inactive links, e-mail, and phone in the illustrated embodiment). Each of the action types has a procedure of the form below:

FIG. 24 is a flow diagram illustrating one embodiment of the procedure handle-actions. The procedure begins at block 2400. At block 2402, the procedure pauses, awaiting an incoming action. The action corresponds to a correction or other variation specified by an advertiser to correct an undesirable condition and the search listings maintained by the advertiser. After an action has been received, at block 2404 the action parameters are extracted from the received action. For example, the action may be transmitted as one or more TCP/IP packets, containing instructions and data for correcting the undesirable condition. These instructions and data are extracted from the packets received from the advertiser.

At block 2406, the variable C is assigned equal to the value corresponding to the condition to be corrected by the received action. At block 2408, it is determined if the condition associated with the values stored in the variable C is still true. If not, at block 2410 a notification is sent to the advertiser associated with the condition that the condition is no longer true. If the condition is still true, at block 2412, a corrective action is executed. The corrective action may be any step or group of steps necessary to change or correct or otherwise modify the condition specified by the advertiser. After execution of the corrective action, at block 2414, it is determined if the action succeeded. That is, it is determined if the desired correction was obtained. If not, the advertiser is notified of the failure to correct the specified action at block 2416. If the action did succeed, at block 2418 the advertiser is notified of the success. Control then returns to block 2402 to await a next incoming action.

The method of FIG. 24 may be embodied in accordance with the pseudocode below.

```
Procedure Handle-actions()
Loop
    Wait for an incoming action;
    Extract action parameters;
    Assign c = condition of action;
    If c is still true
        Execute corrective action;
        If successful
            Notify advertiser(c) of success;
        Else
            Notify advertiser(c) of failure;
        End If;
    Else
        Notify advertiser (c) that c is no longer true;
    End If;
End Loop;
End Procedure;
```

From the foregoing, it can be seen that the present embodiments provide a method and apparatus for advertisers associated with a pay for performance database to manage their listings more effectively. Procedures are provided to specify automatic software agents which monitor the search listings of an advertiser and provide notifications of the occurrence of specified conditions. Notifications of the conditions may be provided to the advertiser in any of a number of convenient channels, such as email or page or facsimile. The notifications may include action types built right in to the notifications so that the advertiser can respond rapidly and conveniently. This increases advertiser convenience, allows more rapid response to changing conditions, and frees up personnel who have heretofore been assigned to monitoring the status of search listings for the advertiser. The features may be provided at minimal expense to the pay for performance system operator and the advertisers.

While a particular embodiment of the present invention has been shown and described, modifications may be made. It is therefore intended in the appended claims to cover such changes and modifications which follow in the true spirit and scope of the invention.

The invention claimed is:

1. A database search system comprising:
   an input device;
   a database of search listings, each search listing being associated with a respective advertiser, each search listing including a search term and at least one of a variable cost per click (CPC) and a variable display rank, the CPC being payable by the respective advertiser of a plurality of advertisers when the search listing including the search term is referred to a user in response to a keyword received at the input device from the user, the search listing being displayable with other search listings in a rank according to the associated CPC and the display rank of the search listing and the other search listings stored in the database;
   a search engine responsive to keywords received at the input device over a computer network from users for searching the database, the search engine including
      code to identify search listings matching a search query received from a user,
      code to order the matching search listings in a search result list using at least one of the display rank and the CPC of the matching search listings,
      code to transmit the search result list to the user as ordered in response to receipt of the search query from the user, and
      code to transfer economic value from the respective advertiser associated with a referred search listing when the referred search listing is referred to the user;
   an output device to provide the search result list to the user
   an account management server in data communication with the search engine; and
   a software agent operative in conjunction with the account management server, the software agent including
      code to receive an automatic notification condition definition at the input device from an advertiser, the automatic notification condition definition defining at least one search listing of the advertiser to be monitored by the software agent and a condition to monitor of the search listing to be monitored by the software agent,
      code to monitor the condition defined by the automatic notification condition definition,
      code to provide condition update information to the advertiser in response to a change detected by the software agent in the condition to monitor, and code to automatically adjust the CPC for a search listing in response to received bid/desired rank information from an advertiser.

2. The database search system of claim 1 wherein the software agent is responsive to an indication of search listings and an indication of CPC range to provide as the condition update information a notification that CPC for the indicated search listing has reached the indicated CPC range.

3. The database search system of claim 1 wherein the software agent is responsive to an indication of search listings and indication of desired rank to provide as the condition update information a notification that display rank for the indicated search listings has reached the indicated desired rank.

4. The database search system of claim 1 wherein the account management server stores advertiser account management information including an advertiser account balance and wherein the software agent receives an indication of a minimum account balance to be monitored.

5. The database search system of claim 1 wherein the account management server stores advertiser account management information including impressions for specified search listings and wherein the software agent receives an indication of impression-counted search listings and an associated impression limit as the condition to be monitored.

6. The database search system of claim 1 wherein the account management server stores advertiser account management information including clicks for specified search listings and wherein the software agent receives an indication of click-counted search listings and an associated click limit as the condition to be monitored.

7. The database search system of claim 1 wherein the account management server stores advertiser account management information including a clickthrough rate for specified search listings and wherein the software agent an indication of clickthrough rate search listings and an associated clickthrough rate limit as the condition to be monitored.

8. The database search system of claim 7 wherein the associated clickthrough rate comprises an aggregate clickthrough rate for a combination of the clickthrough rate search listings.

9. The database search system of claim 1 wherein the account management server stores advertiser account management information including an average cost per clickthrough for specified search listings and wherein the software agent is configured to receive as the condition definition an indication of average cost per clickthrough search listings and an associated average cost per clickthrough limit as the condition to be monitored.

10. The database search system of claim 1 wherein the software agent receives an indication of the minimum CPC required to attain a given display rank for a search term as the condition to be monitored.

11. The database search system of claim 1 wherein the software agent's code to provide condition update information provides one of
    an instant message to a set of instant message accounts prescribed by the advertiser,
    a fax message to a fax number prescribed by the advertiser,
    a page message to a page number prescribed by the advertiser, and
    a voice telephone message to a telephone number prescribed by the advertiser
    as the condition update information to the advertiser.

12. The database search system of claim 1 wherein the software agent's code to provide condition update information provides one of
    an active link embedded in the notification,
    an inactive link in the notification,
    a response e-mail template, and
    a response telephone number
    as the condition update information to the advertiser.

* * * * *